(12) United States Patent
Turco et al.

(10) Patent No.: US 11,795,000 B2
(45) Date of Patent: Oct. 24, 2023

(54) CARRIAGE LIFT ASSEMBLY FOR MATERIALS HANDLING AND STORAGE SYSTEMS

(71) Applicant: Intelligrated Headquarters, LLC, Mason, OH (US)

(72) Inventors: Anthony James Turco, Liberty Township, OH (US); Harsha Sanjeewa Bulathsinghalage, Miamisburg, OH (US); Justen Pahls, Hamilton, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/372,024

(22) Filed: Jul. 9, 2021

(65) Prior Publication Data

US 2023/0011706 A1 Jan. 12, 2023

(51) Int. Cl.
*B65G 1/06* (2006.01)

(52) U.S. Cl.
CPC ..................... *B65G 1/06* (2013.01)

(58) Field of Classification Search
CPC ........................................................ B65G 1/06
See application file for complete search history.

(56) References Cited

U.S. PATENT DOCUMENTS

2017/0313512 A1* 11/2017 Miyagawa ............. B65G 1/065

FOREIGN PATENT DOCUMENTS

| CN | 210213639 U | 3/2020 |
| CN | 111345635 A | 6/2020 |
| WO | 2020/220948 A1 | 11/2020 |

OTHER PUBLICATIONS

European search report and search opinion dated Dec. 9, 2022 for EP Application No. 22182163.

* cited by examiner

*Primary Examiner* — Saul Rodriguez
*Assistant Examiner* — Willie W Berry, Jr.
(74) *Attorney, Agent, or Firm* — Alston & Bird LLP

(57) ABSTRACT

Various embodiments are directed to a carriage lift assembly comprising: at least one frame element configured to secure the carriage lift assembly relative to a first mast and a second mast; and at least one spreader arm extending laterally and defining at least a portion of a lift width; wherein the spreader arm width of the spreader arm comprises a selectively adjustable configuration, wherein the lift width is configured to be selectively adjustable based at least in part on the adjustable configuration of the spreader arm width. In various embodiments, the at least one spreader arm comprises an at least partially resilient configuration such that, in response to a force acting on the spreader arm in one or more directions, the spreader arm may exhibit a movement in the one or more directions so as to absorb at least a portion of the force.

17 Claims, 7 Drawing Sheets

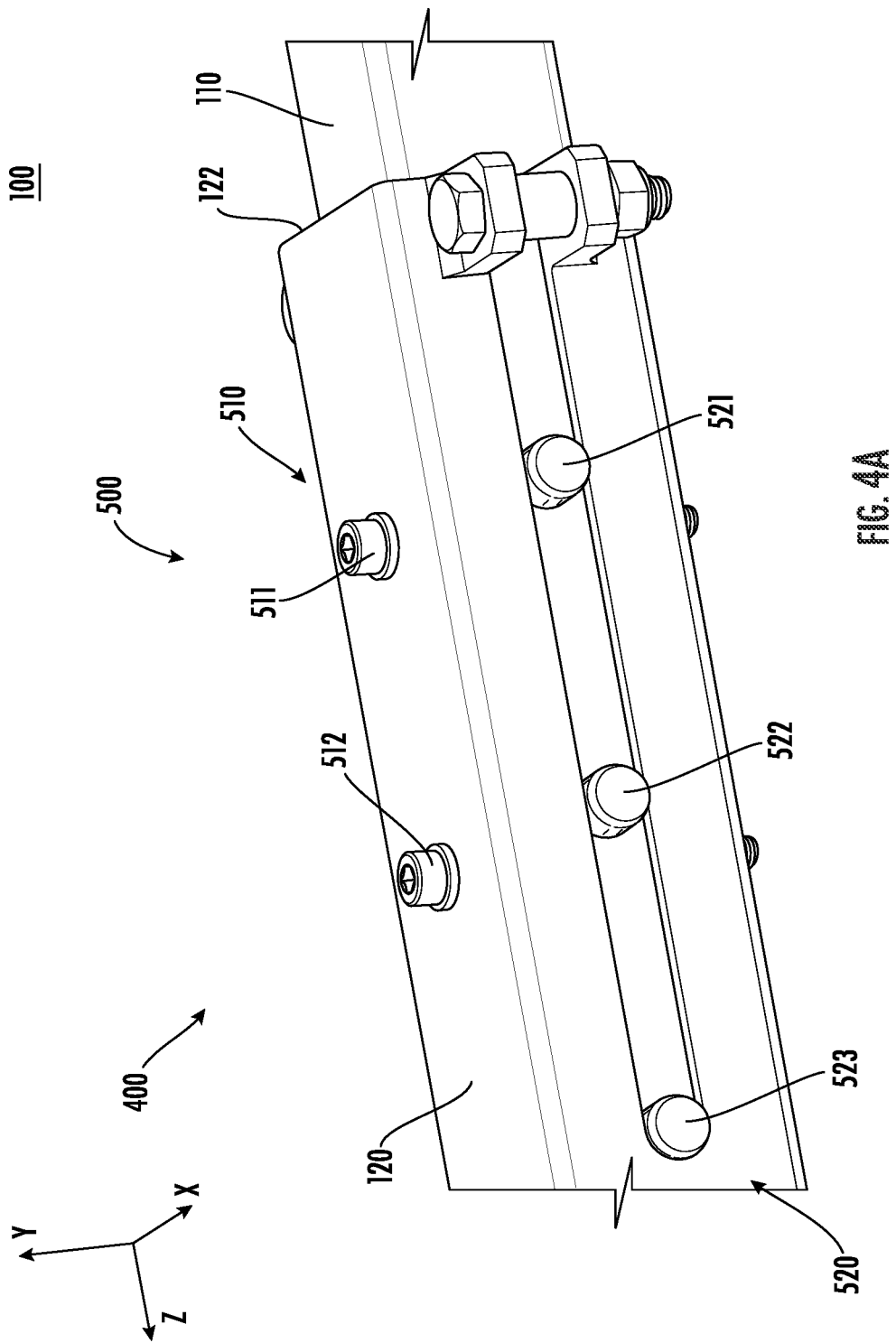

CARRIAGE LIFT ASSEMBLY FOR MATERIALS HANDLING AND STORAGE SYSTEMS

TECHNOLOGICAL FIELD

Example embodiments of the present invention relate generally to material handling systems for handling items, and, more particularly, to carriage lift assemblies.

BACKGROUND

Automated Storage and Retrieval Systems (ASRS), such as ASRS product lifts, are used as material handling systems to facilitate movement of high volumes of articles and maximize the use of valuable storage space. ASRSs are key components in material handling environments by combining automation, software, and labor to optimize the productivity and throughput in a variety of operations. Furthermore, ASRSs provide flexibility and speed allowing use in applications ranging from e-commerce and omnichannel fulfillment to article distribution. Applicant has identified several technical challenges associated with ASRS product lifts. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented hereafter. Various embodiments are directed to a carriage lift assembly and methods of using the same. In various embodiments, a carriage lift assembly may comprise at least one frame element configured to secure the carriage lift assembly relative to a first mast and a second mast, the first mast and the second mast being spaced a lateral distance apart, wherein the carriage lift assembly is defined at least in part by a lift width that extends along at least a portion of the lateral distance between the first mast and the second mast; at least one spreader arm defined at least in part by a spreader arm width extending laterally between a first frame end of the at least one frame element and a second frame end of the at least one frame element, wherein the spreader arm width defines at least a portion of the lift width of the carriage lift assembly; and a load surface configured to support one or more objects disposed thereon; wherein the spreader arm width of the at least one spreader arm comprises a selectively adjustable configuration, wherein lift width of the carriage lift assembly is configured to be selectively adjustable based at least in part on the adjustable configuration of the spreader arm width.

In various embodiments, the at least one spreader arm may comprise a first spreader arm and a second spreader arm spaced a longitudinal distance apart and arranged in an at least substantially coplanar configuration. In various embodiments, the at least one spreader arm comprises a first arm element and a second arm element arranged in an at least partially telescoping configuration defined by an axial range of relative motion between the first arm element and the second arm element, wherein the adjustable configuration of the spreader arm width of the at least one spreader arm is based at least in part on the axial range of relative motion between the first arm element and the second arm element. In certain embodiments, the carriage lift assembly may further comprise at least one spring elements configured to apply a lateral force on at least one of the first arm element and the second arm element in order to facilitate an axial relative motion between the first arm element and the second arm element. In certain embodiments, the first arm element may comprise an outer arm comprising an interior channel extending from a distal end of the outer arm along a first width of the outer arm, and wherein the second arm element comprises an inner arm at least partially disposed within the interior channel of the outer arm such that the telescoping configuration of the at least one spreader arm is defined at least in part by an overlapping configuration of the inner arm and the outer arm along an arm interface portion, the arm interface portion comprising a lateral section of the at least one spreader arm along the spreader arm width.

Further, in various embodiments, the first arm element and the second arm element may be configured to move relative to one another in one or more directions in response to a force acting on the at least one spreader arm in the one or more directions, wherein a relative movement between the first arm element and the second arm element allows the spreader arm to absorb at least a portion of the force acting thereon. In certain embodiments, the at least one spreader arm may comprise a flexible interlock assembly that operably secures the first arm element relative to the second arm element, and defines a range of relative motion between the first arm element and the second arm element in each of the one or more directions. Further, in certain embodiments, the flexible interlock assembly may comprise a first set of interlock elements extending through both the first arm element and the second arm element in a first interlock direction, and a second set of interlock elements extending through both the first arm element and the second arm element in a second interlock direction, wherein the flexible interlock assemble is configured to define the range of relative motion between the first arm element and the second arm element in each of the one or more directions based at least in part on a physical engagement between the first set of interlock elements and the second set of interlock elements.

In various embodiments, the at least one spreader arm may be configured to enable a relative motion between the first arm element and the second arm element in each of a vertical direction, a lateral direction, and a longitudinal direction. In various embodiments, the lift width of the at least one carriage lift assembly may be selectively adjustable between a first lift width, a second lift width, and a third lift width based at least in part on the selectively adjustable configuration of the at least one spreader arm. In various embodiments, the at least one frame element may comprise a first end plate fixedly secured relative to a first lateral end of the at least one spreader arm; and a second end plate fixedly secured relative to a second lateral end of the at least one spreader arm; wherein the first end plate is configured to operatively connect the first lateral end of the at least one spreader arm to the first mast member, and the second end plate is configured to operatively connect the second lateral end of the at least one spreader arm to the second mast member. In certain embodiments, the load surface may be defined at least in part by one or more rollers configured to facilitate a conveyance of the one or more objects disposed thereon in an at least substantially longitudinal direction along the load surface.

Various embodiments are directed to a carriage lift assembly comprising at least one frame element configured to secure the carriage lift assembly relative to a first mast and a second mast, the first mast and the second mast being spaced a lateral distance apart; at least one spreader arm comprising an at least partially resilient configuration and having a spreader arm width that defines at least a portion of a lift width of the carriage lift assembly; and a load surface configured to support one or more objects disposed thereon; wherein the at least one spreader arm is configured such that, in response to a force acting on the at least one spreader arm in one or more directions, at least a portion of the at least one spreader arm is configured to exhibit a movement in the one or more directions so as to absorb at least a portion of the force acting on the spreader arm.

In various embodiments, the at least one spreader arm may comprise a first spreader arm and a second spreader arm spaced a longitudinal distance apart and arranged in an at least substantially coplanar configuration. In certain embodiments, the one or more directions may comprise a plurality of directions such that in response to a first force acting on the at least one spreader arm in a first direction, the at least one spreader arm is configured to exhibit a first movement in the first direction so as to absorb at least a portion of the first force acting on the at least one spreader arm in the first direction, and in response to a second force acting on the at least one spreader arm in a second direction, the at least one spreader arm is configured to exhibit a second movement in the second direction so as to absorb at least a portion of the second force acting on the at least one spreader arm in the second direction. In certain embodiments, the at least one spreader arm may comprise a first arm element defining a first lateral section of the at least one spreader arm width and a second arm element defining a second lateral section of the at least one spreader arm; and wherein the movement exhibited by the at least one spreader arm in the one or more directions is defined at least in part by a relative movement between the first arm element and the second arm element in the one or more directions.

In various embodiments, the first arm element and the second arm element may be arranged in an at least partially overlapping configuration along an arm interface portion of the at least one spreader arm, wherein the an arm interface portion comprises a lateral section along the spreader arm width of the at least one spreader arm through which at least a portion of both the first arm element and the second arm element extend; wherein the movement of the at least one spreader arm in the one or more directions is defined within the arm interface portion. In certain embodiments, the at least one spreader arm may comprise a flexible interlock assembly that operably secures the first arm element relative to the second arm element, wherein the flexible interlock assembly is configured to at least partially define the relative movement between the first arm element and the second arm element in each of the one or more directions. In certain embodiments, the flexible interlock assembly may comprise a first set of interlock elements extending through both the first arm element and the second arm element in a first interlock direction, and a second set of interlock elements extending through both the first arm element and the second arm element in a second interlock direction, wherein the flexible interlock assemble is configured to define the range of relative motion between the first arm element and the second arm element in each of the one or more directions based at least in part on a physical engagement between the first set of interlock elements and the second set of interlock elements. In various embodiments, the first arm element may comprise an outer arm comprising an interior channel extending from a distal end of the outer arm along a first width of the outer arm, and wherein the second arm element comprises an inner arm at least partially disposed within the interior channel of the outer arm such that the inner arm and the outer arm of the at least one spreader arm comprise an overlapping configuration along an arm interface portion, the arm interface portion comprising a lateral section of the at least one spreader arm along the spreader arm width.

BRIEF DESCRIPTION OF THE DRAWINGS

Reference will now be made to the accompanying drawings, which are not necessarily drawn to scale, and wherein:

FIG. 4A-4E illustrate various perspective views of various components of an exemplary carriage lift assembly according to one or more embodiments.

DETAILED DESCRIPTION

Figure 1:
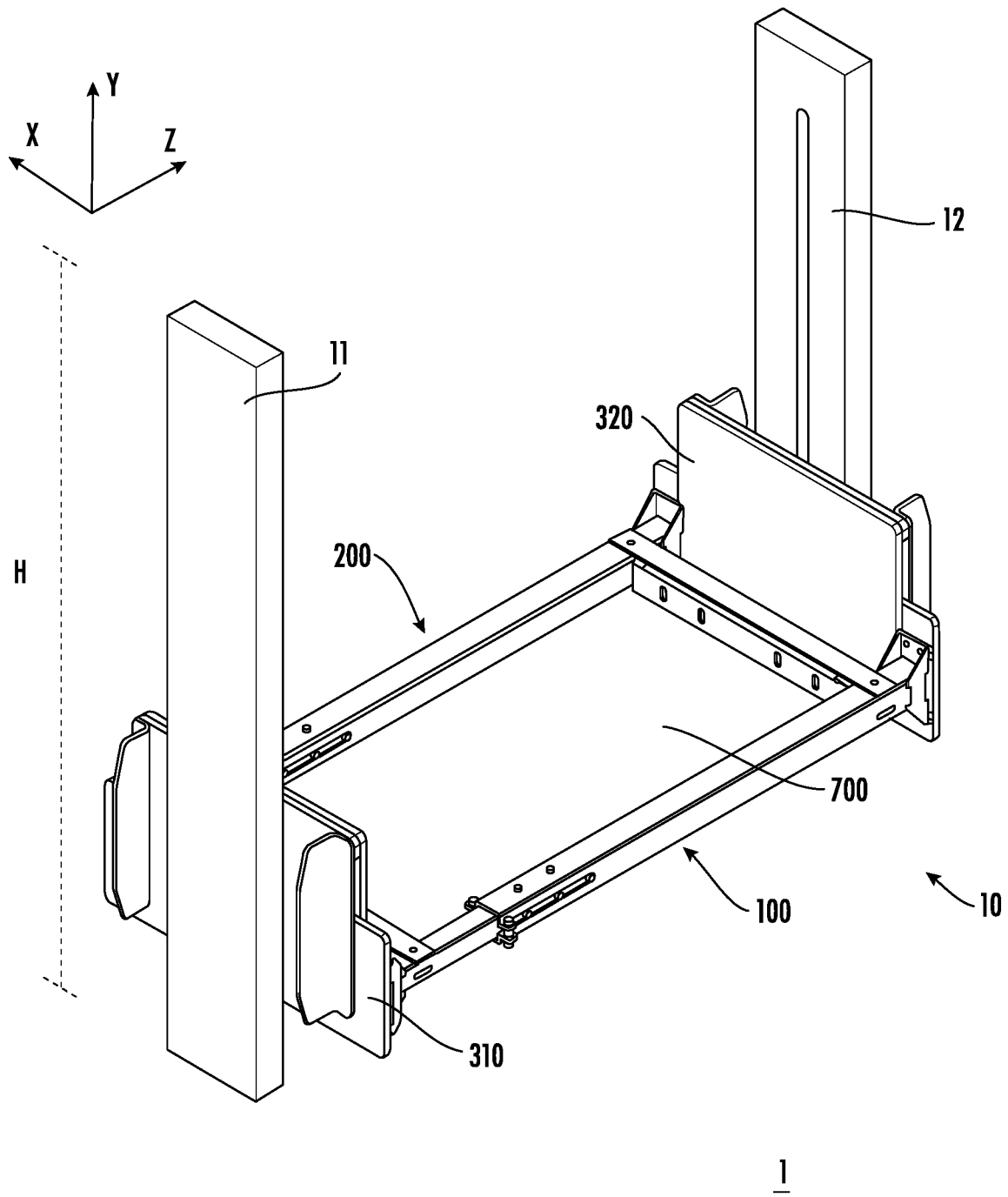
FIG. 1 illustrates a perspective view of an exemplary material handling system according to one or more embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

The words "lateral," longitudinal," and "vertical," when used herein, are intended to be used for referential and/or illustrative purposes in order to provide context for one or more aspects of the present invention, and should be strictly interpreted as being limited a particular universal direction. By way of non-limiting example, as described herein with reference to the directional references provided in the figures, the "lateral" direction may extend along an z-axis, a "longitudinal" direction may extend perpendicularly within at least substantially the same plane as a lateral direction, such as, for example, along an x-axis, and a "vertical" direction may extend perpendicularly within an at least substantially perpendicular plane relative to both the lateral and longitudinal directions, such as, for example, along an a y-axis.

The components illustrated in the figures represent components that may or may not be present in various embodiments of the invention described herein such that embodiments may include fewer or more components than those shown in the figures while not departing from the scope of the invention.

Traditional ASRS products comprise material handling systems that utilize various carriages, carts, lifts, conveyors, and/or the like to facilitate the transportation of objects to a desired delivery location within a factory or a warehouse. For example, a carriage lift assembly may be used to facilitate the vertical transportation of one or more objects between different levels of a storage rack or other storage environment. Traditionally, ASRS products include carriage lift systems that move carriages carrying one or more objects along a height of a lift member, such as, for example, a vertical mast member. The carriage is cantilevered about a vertical end to the mast member such and configured to be vertically moveable along the vertical mast member using a drive system that includes various such assemblies including one or more guiding tracks, bearing assemblies, wheel assemblies, tensioner elements, and/or the like. Often, ASRS product lifts may be configured to transport objects of a particular size, such as, for example, objects having a particular width. In particular, a traditional ASRS product lift may be provided with a load surface defined by a singular width of either 22", 28", or 34" in order to accommodate objects of a particular width. Traditionally, however, ASRS product lifts have a set width and therefore lack the ability to adjust between different width configurations, such as for example, between widths of 22", 28", and/or 34". Such a rigid configuration of ASRS product lifts introduces various challenges during execution of various ASRS processes. For example, handling an object of a width that a product lift is unable to accommodate may render the whole lift inoperable, or otherwise may require an upstream rerouting of the object via a change of the automated storage processes and/or a wholesale change of the ASRS product lift hardware, which may result in extended system downtime, an operational bottleneck at the insufficient product lift, a reduced system capacity, and/or a variety of other system inefficiencies that negatively affect the productivity in the facility.

Further, the rigid configuration of traditional ASRS product lifts leave the drive systems used by the material handling systems vulnerable to unwarranted forces caused by the misalignment of various system components. For example, one or more misaligned mast members, an asymmetric load condition, and/or misalignments caused by manufacturing or operational tolerances, may result in one or more forces being introduced into the system and acting on the ASRS product lift that a rigidly-constructed traditional lift assembly is not calibrated to accommodate. As such, such unwarranted forces acting on the carriage of the lift assembly are transmitted through the carriage and realized at the drive system components, including the bearings, wheels, tracks, and/or the like. Over the life of the materials handling system, such unwarranted forces may result in various system inefficiencies and/or total failures that than render the ASRS product lift inoperable and/or drastically reduce the lifespan of the product lift.

Various embodiments of the present invention relate to carriage lift assemblies having a selectively adjustable configuration such that the width of the lift may be adjusted between a plurality of width configurations. As described herein, in various embodiments, the present invention may comprise a carriage lift assembly operatively secured between two vertical mast members spaced a lateral distance apart. In various embodiments, the present invention comprises one or more spreader arms extending laterally across the width of the lift such that the lift width is defined at least in part by the width of the spreader arm. The one or more spreader arms may be selectively expandable and/or contractable in a lateral direction, such that the width of the one or more spreader arms, and thus, the width of the carriage lift assembly, may be adjusted.

Further, in various embodiments, the present invention relates to carriage lift assemblies having an at least partially resilient configuration, wherein a carriage lift assembly is configured to absorb at least a portion of one or more forces acting thereon, so as to prevent the at least a portion of one or more forces from being realized at one or more components within the drive systems operatively connected to a carriage lift. In various embodiments, the at least partially resilient configuration of the present invention may be defined by at least one spreader arms present within the carriage lift assembly. For example, in various embodiments, in response to receiving a force acting on carriage lift assembly at the spreader arm in one or more directions, at least a portion of the at least one spreader arm may be configured to exhibit a movement in the one or more directions so as to absorb at least a portion of the force acting on the spreader arm. In various embodiments, a spreader arm of the present invention may comprise wherein a first arm element and a second arm element arranged in an at least partially telescoping configuration and operatively connected to one another so as to define a range of relative motion in a vertical, lateral, and/or longitudinal direction, as described herein. For example, in various embodiments, the first arm element and the second arm element of an exemplary spreader arm may be flexibly coupled together along the length of the spreader arm using a flexible interlock assembly that may allow for a relative motion between the first and second arm elements of an exemplary spreader arm in each of the a vertical, lateral, and longitudinal directions. As such, the present invention may comprise a carriage lift assembly having an at least substantially resilient configuration wherein a product lift may be configured to absorb at least a portion of a force acting thereon along a width of one or more spreader arms in order to at least substantially minimize the magnitude of the force realized at one or more components of the drive system of the materials handling system.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

FIG. 1 illustrates a perspective view of a material handling system 1 in accordance with one or more embodiments of the present disclosure. In various embodiments, a material handling system may comprise a mast assembly and a carriage lift assembly. For example, an exemplary material handling system may utilize a mast assembly comprising one or more mast members configured to engage one or more carriage lift assemblies in order to facilitate the movement of the one or more carriage assemblies engaged therewith along a vertical travel path extending along at least a portion of the height of the one or more mast members. As illustrated in FIG. 1, a material handling system 1 may include a mast assembly comprising a first mast member 11 and a second mast member 12, and a carriage lift assembly 10. In various embodiments, the first mast member 11 and the second mast member may be separated a lateral distance apart. In such an exemplary circumstance, the carriage lift assembly 10 may be arranged within the lateral separation distance between the first mast member 11 and the second mast member 12, and may be engaged with both the first mast member 11 and the second mast member 12. For example, as described herein, a first lateral end of the carriage lift assembly 10 may be secured relative to a first mast member 11 and a second lateral end of the carriage lift assembly 10 may be secured relative to a second mast member 12 such that the carriage lift assembly 10 is disposed therebetween.

In various embodiments, the first mast member 11 and the second mast member 12 may each embody one or more frame elements arranged in an at least substantially vertical configuration. In various embodiments, the mast members 11, 12 may each comprise one or more vertical guide members configured to engage a respective portion of a carriage lift assembly 10 and direct the respective portion of the carriage lift assembly 10 engaged therewith along an at least substantially vertical travel path. For example, such an exemplary carriage lift assembly vertical travel path may extend in an at least substantially vertical direction and/or may directionally correspond at least in part to a height direction of one or more of the mast members 11, 12. In various embodiments, vertical travel path of the carriage lift assembly 10 defined by the mast assembly (e.g., the mast members 11, 12) may define a vertical range of motion of the carriage lift assembly 10. For example, a material handling system 1 may utilize one or more drive systems to move (e.g., lift) the carriage lift assembly 10 along a vertical travel path defined at least in part by the mast assembly such that the carriage lift assembly 10 may maintain an at least substantially horizontal configuration as the carriage lift assembly 10 travels either an upwards (i.e. in the positive y-direction) or downwards (i.e. in the negative y-direction) along the vertical travel path. In various embodiments, the one or more drive systems of an exemplary materials handling system 1 may comprise various bearing assemblies, wheels assemblies, track and/or guiding assemblies, tensioner elements, and/or the like, operatively connected to a carriage lift assembly 10 to facilitate the vertical movement thereof, as described herein. The structure and weight of each of the mast members 11, 12 should be such that the mast members 11, 12 remain at least substantially stable when one or more carriage assemblies (e.g., carriage lift assembly 10) travel along at least a portion travel path extending between a lowermost lift position (e.g., at a base of a mast member) and an uppermost lift position (e.g., at a position corresponding to the furthermost position away from the base of the mast member as measured along the height H of the mast member). In various embodiments, a mast member may comprise a height of at least approximately between 10 feet and 100 feet (e.g., between 30 feet and 60 feet. For example, in various embodiments, a mast member may comprise a plurality of mast member elements arranged relative to one another in a vertically stacked configuration so as to extend the height H of the mast member. In one non-limiting example provided for illustrative purposes, a first mast member may have a mast height H of at least approximately 30 feet, and may be constructed using three distinct 10-foot mast member elements assembled relative to one another in a vertically stacked configuration.

Figure 2:
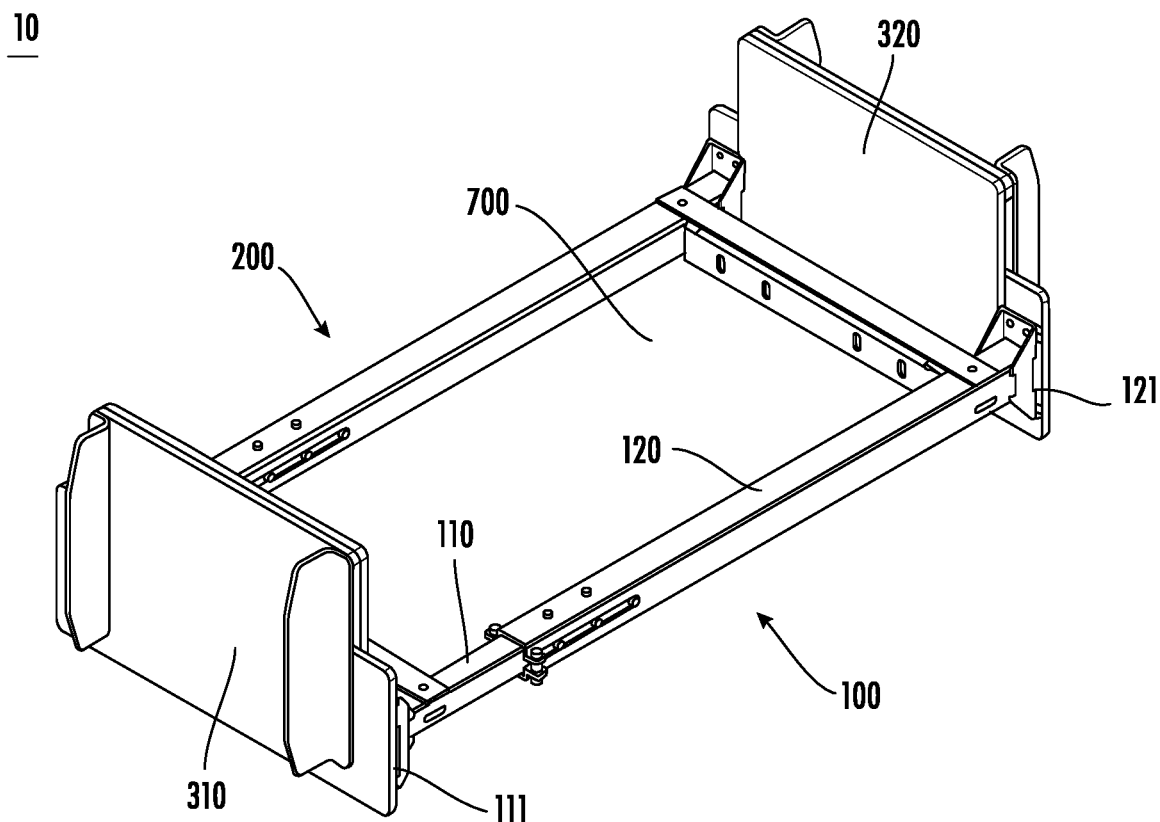
FIG. 2 illustrates a perspective view of an exemplary carriage lift assembly according to one or more embodiments.

In various embodiments, a carriage lift assembly 10 may comprise a first end plate, a second end plate, a load bed, and one or more spreader arms. For example, as illustrated in FIG. 1 and FIG. 2, an exemplary carriage lift assembly 10 may comprise a first end plate 310, a second end plate 320, a load bed 700, and a one or more spreader arms comprising a first spreader arm 100 and a second spreader arm 200. In various embodiments, a first end plate 310 may be secured relative to a first mast member 11 via one or more connection means configured to enable the first end plate 310 to move along a travel path extending along at least a portion of the height of the first mast member 11 (e.g., in an at least substantially vertical direction). Further, in various embodiments, a second end plate 320 may be secured relative to a second mast member 12 via one or more connection means configured to enable the second end plate 320 to move along a travel path extending along at least a portion of the height of the second mast member 12 (e.g., in an at least substantially vertical direction).

In various embodiments, the first end plate 310 and the second end plate 320 may each be further connected to a respective lateral end of a spreader arm such that the spreader arm extends laterally between the first end plate 310 and the second end plate 320. For example, in various embodiments, as illustrated in FIGS. 1 and 2, the one or more spreader arms of a carriage lift assembly 10 may comprise a plurality of spreader arms defined at least in part by a first spreader arm 100 and a second spreader arm 200. In various embodiments, the plurality of spreader arms may define an at least substantially coplanar configuration, wherein each of the spreader arms extends in an at least substantially lateral direction along a common plane (e.g., an at least substantially horizontal plane) between a respective portion of the first end plate 310 and a respective portion of the second end plate 320. For example, as illustrated, a first lateral end 111 of the first spreader arm 100 may be secured relative to the first end plate 310 and a second lateral end 121 of the first spreader arm 100 may be secured relative to the second end plate 320. In such an exemplary circumstance, the first and second lateral ends 111, 121 of the first spreader arm 100 may be secured to the first and second end plates, respectively, at a first longitudinal side (e.g., as defined in the longitudinal direction extending along the x-axis) of the corresponding end plate. Further, for example, a first lateral end of a second spreader arm 200 may be secured relative to the first end plate 310 and a second lateral end of the second spreader arm 200 may be secured relative to the second end plate 320. In such an exemplary circumstance, the first and second lateral ends of the second spreader arm 200 may be secured to the first and second end plates, respectively, at a second longitudinal side of the corresponding end plate. In such an exemplary circumstance, as illustrated, the first spreader arm 100 and the second spreader arm 200 may be separated by a longitudinal distance that defines at least a portion of a length of the carriage lift assembly 10.

In various embodiments, a carriage lift assembly 10 may comprise a load bed 700 that defines one or more surfaces upon which an object may be disposed during a movement of the carriage lift assembly 10, as described herein. In various embodiments, the load bed 700 may comprise one or more surfaces having a surface area that extends at least partially between the first end plate 310 and the second end plate 320. For example, the load bed 700 may embody a floor that is configured to receive one or more objects thereon and provide support in a vertical direction for the one or more objects throughout a movement of the carriage lift assembly 10, such that the one or more objects disposed upon the load bed 700 may be transported along an at least substantially vertical travel path based at least in part on the movement of the carriage lift assembly 10.

In various embodiments, the load bed may be defined by a width that extends in a lateral direction between the first end plate 310 and the second end plate 320, and a length that extends in the longitudinal direction such that at least a portion of the length of the load bed 700 is positioned in between the first end plate 310 and the second end plate 320 at least substantially adjacent the one or more spreader arms. In various embodiments, for example, the length of the load bed 700 may be either at least substantially equal to a lateral separation distance between the first spreader arm 100 and the second spreader arm 200, or, alternatively, at least substantially greater than the lateral separation distance between the two spreader arms. The one or more surfaces defining the load bed 700 may comprise an at least substantially continuous and/or solid surface having a continuous surface area with a length measured in a longitudinal direction and a width measured in a lateral direction between the first end plate 310 and the second end plate 320. Alternatively, or additionally, in various embodiments, the one or more surfaces defining the load bed 700 may be defined by a plurality of rollers (e.g., rolling pins, rows of wheels, and/or the like) arranged at least substantially adjacent one another so as to collectively define a surface upon which the one or more objects may be disposed. In such an exemplary circumstance, the plurality of rollers defining the load bed 700 may embody a conveyor surface, wherein the plurality of rollers is arranged so as to facilitate a movement of one or more objects disposed thereon in a longitudinal direction along the length of the load bed 700. As a non-limiting example, in an exemplary circumstance wherein the carriage lift assembly 10 comprises a motorized drive roller (MDR) cart, the load bed 700 may be defined by a plurality of rollers comprising one or more motorized drive rollers (e.g., master rollers) which drives one or more slave rollers in order to facilitate a movement of an object disposed thereon. In various embodiments, the carriage lift assembly 10 may be arranged such that the one or more spreader arms (e.g., a first spreader arm 100 and/or a second spreader arm 200) may provide support for at least a portion of the load bed 700.

In addition to the carriage lift assembly 10, the material handling system 1 may further include a variety of components and/or subsystems, such as, but not limited to, induction conveyors, sortation systems, chutes, identification systems, vision systems, robotic subsystems, and the like, for handling and processing the objects, articles, and/or the like not shown here for the sake of clarity of description. For example, an exemplary material handling system 1 may comprise a vision system that may have one or more sensors positioned at predetermined locations (e.g., a plurality of vertical positions) within the material handling system 1 to generate inputs corresponding to one or more known and/or identified characteristics of an object being transported by a carriage lift assembly 10 (e.g., disposed upon load bed 700). Such a vision system may be implemented using a stand-alone camera or a network of imagers, sensors, cameras, identification systems, and the like for determining characteristics of the objects being handled by the material handling system 1. In accordance with various embodiments of the present disclosure, the characteristics of an exemplary object disposed upon a carriage lift assembly 10 may include, but are not limited to, object size, weight, position, edge detection, marker and/or label detection, and/or the like. For example, in various embodiments, the size of an object may be defined by an object width (e.g., measured laterally), an object length (e.g., measured longitudinally), and/or an object height (e.g., measured vertically). The characteristics of an object may be used to control one or more parts, drives, motors, and/or assemblies of the material handling system 1, such as, for example, one or more components of the carriage lift assembly 10. For example, as described in further detail herein, in various embodiments, the telescoping configuration of the one or more spreader arms (e.g., a first spreader arm 100 and a second spreader arm 200) of the carriage lift assembly 10 may utilized to selectively adjust the width of the spreader arms 100, 200—and thus, the operative width of the carriage lift assembly 10—based at least in part on an identified width of an object disposed upon a load bed 700. In various embodiments, a material handling system 1 may further include a control unit (not shown) in communication with the one or more parts, drives, motors, and/or assemblies of the material handling system 1. The control unit may include at least one processor that may execute instructions to cause the material handling system 1 to perform specific operations. In accordance with the embodiments of the present disclosure, a processor, in conjunction with the control unit, may execute instructions to cause the vision system to determine orientation, position, and location of the objects to be lifted and/or conveyed.

As described herein, the material handling system 1 may comprise one or more drive systems configured to facilitate a movement of the carriage lift assembly 10 from a first vertical position as measured along a mast height of one or more of the mast members, along an at least substantially vertical travel path to a second vertical position, so as to transport one or more objects disposed on the carriage lift assembly 10 between various levels and/or stories provided at different vertical heights relative to a ground surface. For example, in various embodiments, the material handling system 1 may comprise one or more bearing assemblies, wheel assemblies, belt assemblies, and/or the like, that may facilitate the upward and/or downward movement of the carriage lift assembly 10 relative to the first and second mast members 11, 12.

FIG. 2 illustrates a perspective view of an exemplary carriage lift assembly 10 according to one or more embodiments of the present invention. In particular, FIG. 2 illustrates a carriage lift assembly 10 comprising a first spreader arm 100 and a second spreader arm 200 that each extend in a lateral direction between a first end plate 310 and a second end plate 320 so as to define at least a portion of the width of the carriage lift assembly 10. In various embodiments, a carriage lift assembly may comprise a spreader arm comprising a telescoping configuration. In such an exemplary circumstance, the spreader arm may be adjustably extendable such that the width of the spreader arm in the lateral direction may be selectively increased and/or decreased. For example, as shown by the exemplary first spreader arm 100 illustrated in FIG. 2, in an exemplary circumstance wherein a first lateral end 111 of a spreader arm 100 is secured relative to the first end plate 310 and a second lateral end 121 of the first spreader arm 100 is secured relative to the second end plate 320, the telescoping configuration of the first spreader arm 100 may facilitate the selective adjustment of the width of the carriage lift assembly 10. As described herein, the telescoping configuration of the first and second spreader arms 100, 200 may be utilized to extend and/or contract each of the spreader arms 100, 200 in order to configure the carriage lift assembly 10 so as to accommodate an object width of one or more objects to be transported thereon.

In various embodiments, a spreader arm may comprise an inner arm and an outer arm that are arranged relative to one another so as to define the telescoping configuration of the spreader arm. In various embodiments, the inner arm and outer arm of a spreader arm may each comprise a rod, bar, pole, tube, beam, and/or the like having a length that extends in at least substantially linear direction along a central axis thereof. In various embodiments, an outer arm of a spreader arm may comprise an interior channel defined by a hollow center portion of the outer arm that extends from a lateral end of the outer arm (e.g., beginning at an opening in an end surface of the outer arm) along at least a portion of a length of the outer arm. In various embodiments, the inner arm may comprise a cross-sectional configuration that corresponds at least in part to the shape of the interior channel of the outer arm, such that at least a portion of an inner arm may be inserted into the interior channel of the outer arm via the opening in the end surface of the outer arm. For example, in various embodiments, the inner arm and the outer arm of a spreader arm may have corresponding cross-sectional geometries, wherein the cross-sectional area of the inner arm is at least substantially smaller than the cross-sectional area of the outer arm. In such an exemplary circumstance, the inner arm may be arranged in an at least substantially coaxial configuration relative to the outer arm. In various embodiments, the inner arm may be laterally translated in an axial direction along the central axis of the interior channel of the outer arm, such as, for example, into and/or out from the lateral end of the outer arm through which at least a portion of the inner arm extends. In various embodiments, such a lateral translation of the inner arm relative to the outer arm in an axial direction along the central axis of the outer arm may define the telescoping configuration of an exemplary spreader arm.

Figure 3A:
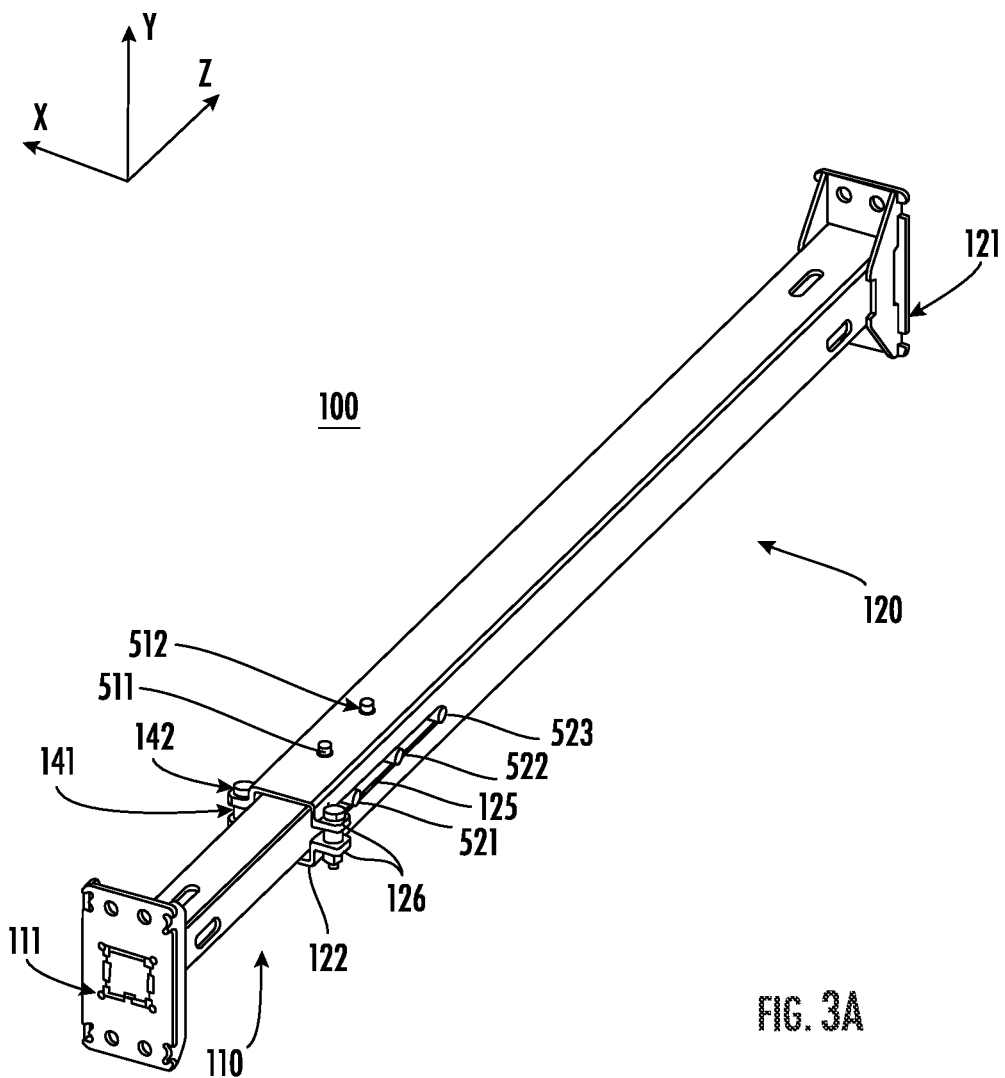
FIGS. 3A-3C illustrate various perspective and cross-sectional views of an exemplary carriage lift assembly according to one or more embodiments.

For example, as illustrated in FIGS. 2 and 3A, the exemplary first spreader arm 100 may comprise an inner arm 110 and an outer arm 120. The inner arm 110 and the outer arm 120 may each comprise linear rail elements having an at least substantially rectangular cross-section. In such an exemplary configuration, both the inner arm 110 and the outer arm 120 may be defined at least in part by the four exterior surfaces extending along a width of the respective arm. For example, the inner arm may be defined at least in part by a cross-sectional perimeter that is at least substantially less than a cross-sectional perimeter of an interior channel of the outer arm 120, such that at least a portion of the inner arm 110 may be inserted into the interior channel of the outer arm 120 in order to facilitate the telescoping configuration of the spreader arm 100, as described herein. For example, the telescoping configuration of the first and second spreader arms 100, 200 may be utilized to axially extend and/or contract each of the spreader arms 100, 200 in one or more lateral directions such that the lateral distance between the first end plate 310 and the second end plate 320 secured, respectively, relative to the two opposing lateral ends of the spreader arms 100, 200 is increased and/or decreased by a distance corresponding to the amount by which the spreader arms 100, 200 are extended and/or contracted (e.g., a relative lateral translation distance between an inner arm 110 and an outer arm 120, as measured in an axial direction). In such an exemplary configuration wherein the lateral distance between the first end plate 310 and the second end plate 320 is increased and/or decreased based at least in part on the relative motion between an inner arm 110 and an outer arm 120 of a spreader arm 100, the width of the carriage lift assembly 10 may be increased and/or decreased by a distance corresponding to the amount by which the lateral distance between the first end plate 310 and the second end plate 320 is increased and/or decreased. Accordingly, in various embodiments, the width of the carriage lift assembly 10 may be increased and/or decreased by a distance corresponding to the amount by which the spreader arms 100, 200 are extended and/or contracted (e.g., a relative lateral translation distance between an inner arm 110 and an outer arm 120, as measured in an axial direction). As described herein, an inner arm 110 of a first spreader arm 100 may be laterally translated relative to an outer arm 120 operatively coupled thereto in order to extend and/or contract the first spreader arm 100 so as to configure the carriage lift assembly 10 for accommodating a width of an object that is to be transported by the carriage lift assembly 10. For example, in various embodiments, an exemplary carriage lift assembly may be selectively adjustable between a plurality of spreader arm widths, each corresponding to a respective lift width. In various embodiments, an exemplary spreader arm may be selectively adjustable between a plurality of spreader arm widths such that the lift width of an exemplary lift carriage assembly 10 may be configurable between at least three lift width configurations. As non-limiting examples, the lift width of an exemplary lift carriage assembly 10 may selectively adjustable between widths of at least approximately 22", 28", and 34" (e.g., lift widths corresponding to industry-defined 22BF, 28BF, and 34BF width dimensions).

Figure 3B:
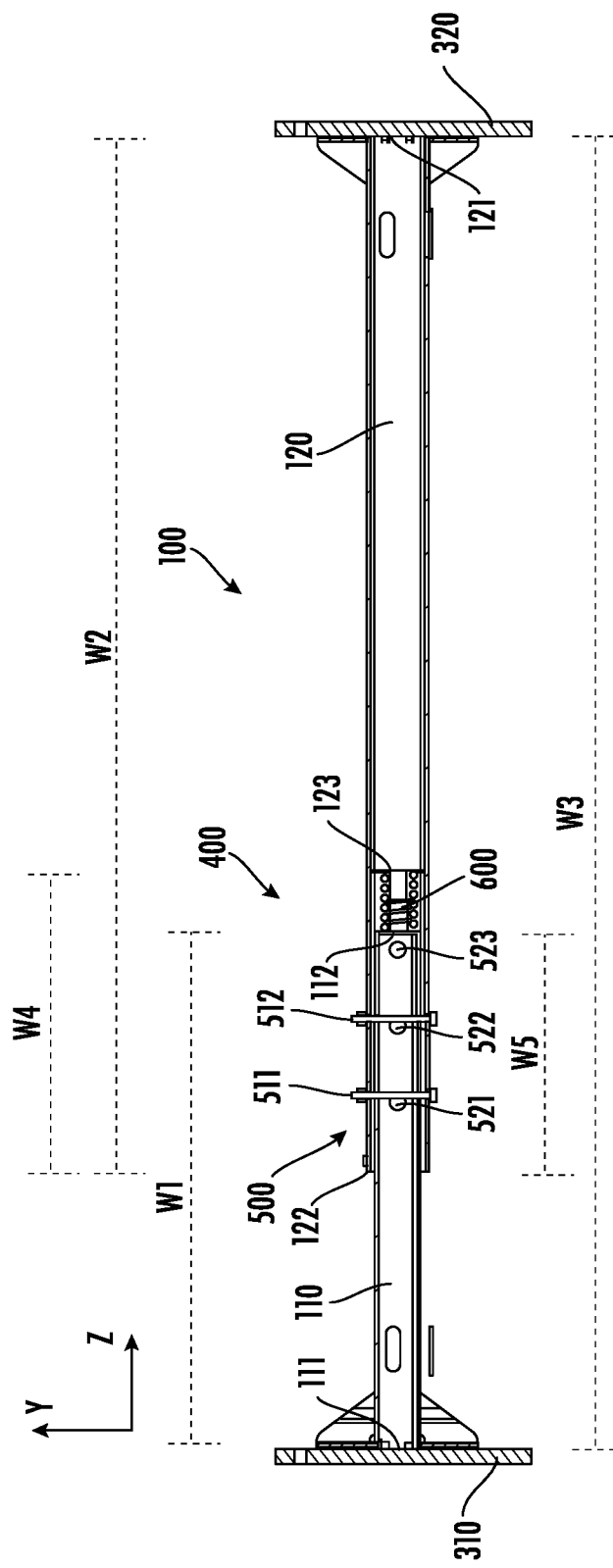
Figure 3C:
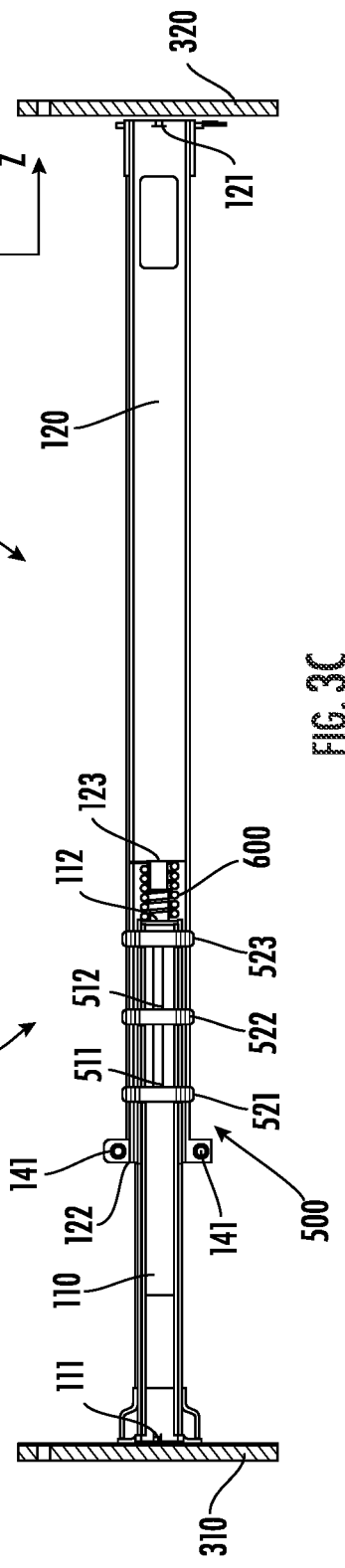

FIGS. 3A-3C illustrate various perspective and cross-sectional views of an exemplary spreader arm according to one or more embodiments of the present invention. In particular, FIG. 3A illustrates a perspective view of a spreader arm 100 of an exemplary carriage lift assembly according to one or more embodiments of the present invention. As illustrated, an exemplary spreader arm 100 may comprise an inner arm 110 and an outer arm 120, the outer arm 120 being configured to receive at least a portion of the inner arm 110 (e.g., at least a portion of the width of the inner arm 110) within an interior channel via an opening disposed about a second lateral end 122 of the outer arm 120. As described herein, the interior channel of the outer arm 120 may be defined by a hollow center portion extending from the opening at the second lateral end 122 of the outer arm 120 along at least a portion of the width of the outer arm 120 (e.g., along the central axis thereof). In various embodiments, the spreader arm 100 may be configured to enable a relative motion between the inner arm 110 and the outer arm 120 in a lateral direction along one or more of the central axes thereof, such that a width of the portion of the inner arm 110 disposed within the interior channel of the outer arm 120 may vary as the inner arm 110 translates laterally relative to the outer arm 120.

FIGS. 3B and 3C illustrates a cross-sectional side view and a cross-sectional top view, respectively, of an exemplary spreader arm 100 according to one or more embodiments of the present invention. As described herein, the exemplary spreader arm 100 may comprise an inner arm 110 and an outer arm 120.

In various embodiments, an inner arm 110 may comprise a width W1 that extends between a first lateral end 111 and a second lateral end 112 thereof. For example, as illustrated, the inner arm 110 may be cantilevered to the first end plate 310 at the first lateral end 111 of the inner arm 110, which may be secured relative to a first end plate 310 via one or more connection means. In various embodiments, the first lateral end 111 of the inner arm 110 may embody a lateral end of the spreader arm 100, such as, for example, a first lateral end the spreader arm 100. For example, as illustrated, the first lateral end 111 of the inner arm 110 may be secured relative to a first end plate 310 of the carriage lift assembly via one or more connection means. The inner arm 110 may extend away from the first end plate 310 in a latterly outward direction (e.g., in the positive z-direction, as shown in FIGS. 3B and 3C) along a width of the inner arm 110 to a second lateral end 112 of the inner arm 110 disposed within an interior channel of the outer arm 120, as described herein. For example, in various embodiments wherein the inner arm 110 of the first spreader arm 100 is arranged in a nominal position (e.g., a baseline configuration wherein the carriage lift assembly 10 is not subject to a load condition caused by one or more objects being present on a load bed 700), the inner arm 110 may extend laterally outward from the first end plate 310 in a direction that is at least substantially perpendicular to the surface of the first end plate 310 to which the first lateral end 111 of the inner arm 110 is secured.

Further, in various embodiments, an outer arm 120 may comprise a width W2 that extends between a first lateral end 121 and a second lateral end 122 thereof. For example, as illustrated, the outer arm 120 may be cantilevered to the second end plate 320 at the first lateral end 121 of the outer arm 120, which may be secured relative to the second end plate 320 via one or more connection means. In various embodiments, the first lateral end 121 of the outer arm 120 may embody a lateral end of the spreader arm 100, such as, for example, a second lateral end the spreader arm 100. For example, as illustrated, the first lateral end 121 of the outer arm 110 may be secured relative to a second end plate 320 of the carriage lift assembly via one or more connection means. The outer arm 120 may extend away from the second end plate 320 in a latterly outward direction (e.g., in the negative z-direction, as shown in FIGS. 3B and 3C) along a width of the outer arm 120 to a second lateral end 122 of the outer arm 120 defining the opening through which the at least a portion of the inner arm 110 (e.g., a second lateral end 112 of the inner arm 110) may extend. For example, in various embodiments wherein the outer arm 120 of the first spreader arm 100 is arranged in a nominal position, as described herein, the outer arm 120 may extend laterally outward from the second end plate 320 in a direction that is at least substantially perpendicular to the surface of the second end plate 320 to which the first lateral end 121 of the outer arm 120 is secured. In such an exemplary circumstance wherein the first spreader arm 100 is arranged in a nominal position, the inner arm 110 and the outer arm 120 may extend from the first end plate 310 and the second end plate 320, respectively, in at least substantially opposite lateral directions, such that the inner arm 110 and the outer arm 120 are at least substantially aligned in a coaxial configuration along the central axes thereof.

As described herein, in various embodiments, an outer arm of an exemplary spreader arm may comprise an interior channel that extends from one lateral end of the outer arm along at least a portion of the width of the outer arm along a central axis of the outer arm, and is configured such that at least a portion of an inner arm extending through an opening at the lateral end of the outer arm may be received within the interior channel of the outer arm. For example, as illustrated in FIGS. 3B and 3C, an outer arm 120 of an exemplary spreader arm 100 may comprise an interior channel that extends from a second lateral end 122 of the outer arm 120 along a portion of the width of the outer arm 120 along a central axis of the outer arm 120. In various embodiments, the interior channel of the outer arm 120 may be defined in part by an opening disposed about the second lateral end 122 of the outer arm 120 and may be configured such that at least a portion of an inner arm 110 extending through the opening at the second lateral end 122 of the outer arm 120 may be received within the interior channel of the outer arm 120. As described herein, in various embodiments, the width of the portion of the inner arm 110 that is disposed within the interior channel of the outer arm 120 may vary as the inner arm 110 is moved laterally relative to the outer arm 120. For example, in various embodiments, the width of the portion of the inner arm 110 disposed within the interior channel of the outer arm 120, and thus, the overall width W3 of the spreader arm 100 may vary based at least in part on a selective adjustment of the lateral position of the inner arm 110 relative to the outer arm 120 between one or more predefined relative configurations, as described herein. Additionally, or alternatively, in various embodiments, the width of the portion of the inner arm 110 disposed within the interior channel of the outer arm 120, and thus, the overall width W3 of the spreader arm 100 may vary in response to one or more forces acting on the inner arm 110 and/or the outer arm 120 in an at least substantially lateral direction. For example, as described in further detail herein, the spreader arm 100 may be configured such that the inner arm 110 may move relative to the outer arm 120 in a lateral direction such that the width of the portion of the inner arm 110 disposed within the interior channel of the outer arm 120 may vary in response to one or more lateral forces generated by a misalignment condition(s) within the materials handling system that are realized at the spreader arm 100.

In various embodiments, the interior channel of the outer arm 120 may be further defined in part by an interior channel end surface 123 that defines an end of the interior channel within the outer arm 120. For example, as illustrated, an interior channel within an outer arm 120 may have a width W4 that is defined by a distance between the opening disposed about the second lateral end 122 of the outer arm 120 and the interior channel end surface 123, as measured along a central axis of the outer arm 120. In various embodiments, for example, the interior channel end surface 123 of the outer arm may comprise rigid surface positioned along a plane that is at least substantially perpendicular to the central axis of the outer arm 120, such that the interior channel end surface 123 may act as a stop that at least partially defines a range of relative motion of the inner arm 110 relative to the outer arm 120 in the positive z-direction by preventing the inner arm 110 disposed within the interior channel from being further translated in the positive z-direction relative to the outer arm 120. For example, in such an exemplary circumstance, the interior channel end surface 123 may be engaged by a second lateral end 112 (e.g., a distal end) of the inner arm 110 disposed within the interior channel and/or one or more components operatively connected thereto (e.g., a spring element), such that one or more pushing forces acting on the inner arm 110 in the positive z-direction may be transmitted to the interior channel end surface 123. The interior channel end surface 123 may be configured to receive at least a portion of the pushing forces transmitted from the inner arm 110 and transmit an at least substantially equal and opposite pushing force in the negative z-direction back to the inner arm 110, thereby preventing the inner arm 110 from extending further along the width of the outer arm 120.

In various embodiments, at least a portion of a width of an inner arm 110 may be disposed within at least a portion of an interior channel of an outer arm 120, such that the width of the inner arm 110 portion disposed within the interior channel and a width of a corresponding portion of the outer arm 120 extending around and/or adjacent to the width of the inner arm 110 portion disposed within the interior channel may collectively define an at least partially overlapping configuration between the inner arm 110 and the outer arm 120. In various embodiments, for example, the overlapping configuration of the inner arm 110 and the outer arm 120 may define at least in part by an arm interface portion 400 provided along a lateral section of the spreader arm 100 through which both a portion of the inner arm 110 and a portion of the outer arm 120 extend. For example, an arm interface portion 400 may be defined by the respective widths (e.g., portions) of the inner arm 110 and the outer arm 120 that are disposed between the second lateral end 122 (e.g., a distal end) of the outer arm 120 and the second lateral end 112 of the inner arm 110, as measured along an at least substantially lateral direction (e.g., along the central axes of the inner and outer arms 110, 120). As illustrated in FIG. 3B, the inner arm 110 and the outer arm 120 of the spreader arm 100 may be configured relative to one another such that the spreader arm 100 comprises an arm interface portion 400 defined at least in part by an arm interface portion width W5.

In various embodiments, an exemplary spreader arm may comprise a spring element positioned laterally between an inner arm and an outer arm and configured to transmit respective spring forces (e.g., a pushing force) to each of the inner arm and the outer arm in at least substantially opposite lateral directions so as to facilitate a relative motion between the inner arm and the outer arm in the lateral direction. For example, as illustrated in FIGS. 3B and 3C, a spreader arm 100 may comprise a spring element 600 disposed within the interior channel of the outer arm 120 and extending in an at least substantially lateral direction between an interior channel end surface 123 and a second lateral end 112 of the inner arm 110. As shown, the spring element 600 may be predisposed to apply a spring force (e.g., a pushing force) to both the second lateral end 112 of the inner arm 110 in first lateral direction (e.g., a negative z-direction), and the interior channel end surface 123 of the outer arm 120 in second lateral direction opposite the first lateral direction (e.g., a positive z-direction). In such an exemplary configuration, the spring element 600 of an exemplary spreader arm 100 may be configured to distribute one or more lateral pushing forces to an inner arm 110 and/or an outer arm 120 so as to facilitate a relative motion between the inner and outer arms 110, 120. For example, a spring element 600 may be configured to initiate and/or facilitate a lateral separation of the inner arm 110 from the outer arm 120 a lateral direction, the lateral separation being defined by an increased lateral distance between at least a portion of the inner arm 110 (e.g., the second lateral end 112) and at least a portion of the outer arm 120 (e.g., the interior channel end surface 123). As described herein, in various embodiments, a lateral movement of the portion of the inner arm 110 disposed within the interior channel of the outer arm 120 relative to an at least substantially adjacent surface of the outer arm 120 may result in one or more frictional forces that provide additional resistance acting against the lateral relative motion between the inner arm 110 and the outer arm 120. In such an exemplary circumstance, a spring element 600 may be configured to assist in overcoming the frictional forces by causing one or more spring forces opposing the frictional forces to be transmitted in a lateral direction to the inner arm 110 and/or the outer arm 120 in order to at least substantially reduce the magnitude of the force(s) (e.g., the frictional forces) opposing the relative lateral motion between the inner arm 110 and/or the outer arm 120. Although described herein as a spring element 600, it should be understood that in various embodiments, an exemplary spreader arm 100 may comprise any component capable of operably generating and/or providing one or more continuous forces configured to at least substantially minimize the effect of the frictional forces realized by the spreader arm during a lateral relative movement between the inner arm 110 and the outer arm 120.

As described herein, in various embodiments wherein a spreader arm 100 comprises a telescoping configuration defined by an outer arm 120 having an interior channel configured to receive at least a portion of the inner arm 110 such that the at least a portion of an inner arm 110 may be removably and/or adjustably disposed within the outer arm 120, the spreader arm 100 may comprise an arm interface portion 400 defined by a lateral section of the spreader arm 100 (e.g., an intermediate width of the spreader arm 100 defined between the first lateral end 111 and the second lateral end 121 of the spreader arm 100) along which the inner arm 110 is disposed within the outer arm 120. By way of further example, an arm interface portion 400 of an exemplary spreader arm 100 may be defined by a portion of the spreader arm 100 width along which respective portions of the inner arm 110 and the outer arm 120 are arranged in an overlapping configuration, as described herein.

In various embodiments, a spreader arm of an exemplary carriage lift assembly may comprise an at least partially resilient configuration. For example, an exemplary spreader arm comprising an at least partially resilient configuration may be configured to absorb at least a portion of one or more forces acting on the spreader arm such that the at least a portion of the one or more forces are not transmitted from the spreader arm to one or more other components of an exemplary materials handling system. In various embodiments, a spreader arm extending between a first end plate and a second end plate of a carriage lift assembly, as described herein, may realize one or more forces transmitted to the spreader arm via one or more components of the materials handling system that are either directly or indirectly connected to and/or engaged with the spreader arm, such as, for example, one or more mast members of a mast assembly, one or more end plates, a load bed, and/or the like. For example, various forces may be generated within a materials handling system as a result of one or more misalignments of various system components, such as, for example, one or more misaligned mast members, an asymmetric load condition, manufacturing and/or operational tolerances, and/or the like. In various embodiments, an exemplary force received by the spreader arm may be defined by one or more directional components, such that the force may act on the spreader arm in each of the one or more directions corresponding to the directional components of the force. For example, in various embodiments, a force acting on a spreader arm may comprise a lateral component, a longitudinal component, a vertical component, and/or an angular component, or any combination thereof.

As described in further detail herein, a resilient configuration of a spreader arm may be facilitated by an arm interface portion of the spreader arm, which may be defined along a portion of the width of the spreader arm. For example, as illustrated in FIGS. 3A-3C, an exemplary spreader arm 100 may comprise a resilient configuration that may be facilitated at least in part by an arm interface portion 400 of the spreader arm. In various embodiments, an arm interface portion 400 of the spreader arm 100 may realize one or more forces acting on the spreader arm 100 in a first direction and may be configured such that, in response to the one or more forces acting on the spreader arm 100 in a first direction, at least a portion of the arm interface portion 400 may exhibit a movement (e.g., deflection, translation, rotation, and/or the like) in a direction corresponding to the first direction of the one or more forces. In various embodiments, such a reactive movement exhibited by the arm interface portion 400 may enable the spreader arm 100 (e.g., via the arm interface portion) to absorb at least a portion of a force acting on the spreader arm 100 in one or more directions corresponding to the direction(s) of the force, such that the magnitude of the force transmitted from the spreader arm 100 to one or more other components of an exemplary materials handling system may be at least substantially less than the magnitude of the force received by the spreader arm 100. For example, in various embodiments, the reactive movement of the at least a portion of the arm interface portion 400 in a first direction may be defined at least in part by a relative motion between an inner arm 110 and an outer arm 120 of the spreader arm 100 in the first direction, as described herein.

In various embodiments, a spreader arm may further comprise a flexible interlock assembly that may further define, at least in part, the resilient configuration of the spreader arm. In various embodiments, a flexible interlock assembly of a spreader arm may operably secure an inner arm relative to an outer arm of the spreader arm, and may further define a range of relative motion between the inner arm and the outer arm in one or more directions. A flexible interlock assembly may operably secure an inner arm of a spreader arm relative to an outer arm of the spreader arm. For example, in various embodiments, a flexible interlock assembly may be configured to operably secure an inner arm relative to an outer arm within an arm interface portion of a spreader arm. A flexible interlock assembly may be configured to couple the inner arm to the outer arm within an arm interface portion so as to allow the inner arm and the outer arm to move relative to one another in one or more directions. As a further non-limiting example, a flexible interlock assembly may be configured to operably secure a portion of the inner arm defining an inner part of an arm interface portion relative to a portion of the outer arm defining an outer part of the arm interface portion. In various embodiments, a flexible interlock assembly may comprise a plurality of interlock elements. As described herein, an inner arm may be secured relative to an outer arm within an arm interface portion of a spreader arm using one or more interlock elements of a flexible interlock assembly arranged about the arm interface portion and configured to engage at least a portion of both the inner arm and the outer arm. In various embodiments, an interlock element of a flexibly interlock assembly may define a fastening means that may be used to secure an inner arm and an outer arm relative to one another. For example, the flexible interlock assembly may utilize one or more interlocking elements engaged with the respective overlapping portions of both the inner arm and the outer arm, such as, for example, a portion of the inner arm disposed within the interior channel of the outer arm and an at least substantially adjacent portion of the outer arm, to flexibly couple the overlapping portions of the inner arm and outer arm to one another.

As illustrated in FIGS. 3A-3C, an exemplary spreader arm 100 may comprise a flexible interlock assembly 500 that may operably secure inner arm 110 relative to outer arm 120. The flexible interlock assembly 500 operably secure the inner arm 110 relative to the outer arm 120 within an arm interface portion 400. For example, the flexible interlock assembly 500 may utilize one or more interlocking elements engaged with the respective overlapping portions of both the inner arm 110 and the outer arm 120 (e.g., at the arm interface portion) to flexibly couple the inner arm 110 to the outer arm 120 by defining a range of relative motion between the inner and outer arms 110, 120 in one or more directions. As described herein, the range of relative motion between the inner arm 110 and the outer arm 120 in each of the one or more directions may be defined based at least in part on the configuration of the flexible interlock assembly 500. For example, the flexible interlock assembly 500 may comprise a plurality of interlock elements each positioned within an arm interface portion 400 within a respective plane along the width of the spreader arm 100. The flexible interlock assembly 500 may be configured to define a range of relative motion between the inner arm 110 and the outer arm 120 in one or more directions based at least in part on the physical engagement of one or more of the plurality of interlock elements with one or more elements, surfaces, and/or the like positioned about the spreader arm 100, such as, for example, a second interlock element of the plurality of interlock elements, a surface, groove, and/or other geometric feature of the inner arm 110 and/or outer arm 120, and/or the like, so as to limit (e.g., prevent) further movement of the one or more interlock elements beyond the element, surface, groove, feature, and/or the like engaged therewith.

In various embodiments, a flexible interlock assembly 500 may comprise a plurality of interlock elements, each comprising an at least substantially rigid connector element having an at least substantially linear configuration, such as, for example, a pin, a screw, a bolt, and/or the like. In various embodiments, the plurality of interlock elements may comprise one or more first interlock elements 510 extending through an arm interface portion 400 in a first linear direction so as to engage at least substantially adjacent overlapping portions of the inner arm 110 and the outer arm 120. In various embodiments, the one or more first interlock elements 510 may comprise a plurality of first interlock elements 510 spaced a lateral distance apart from one another along the width of the spreader arm 100 (e.g., at least partially within the arm interface portion 400), each first interlock element extending through the spreader arm 100 in an at least substantially parallel direction relative to one another. For example, each of the plurality of first interlock elements 510 may extend through the spreader arm 100 in a first linear direction (e.g., a vertical direction). Further, in various embodiments, the plurality of interlock elements may comprise one or more second interlock elements 520 extending through an arm interface portion 400 in a second linear direction so as to engage at least substantially adjacent overlapping portions of the inner arm 110 and the outer arm 120. In various embodiments, the one or more second interlock elements 520 may comprise a plurality of second interlock elements 520 spaced a lateral distance apart from one another along the width of the spreader arm 100 (e.g., at least partially within the arm interface portion 400), each second interlock element extending through the spreader arm 100 in an at least substantially parallel direction relative to one another. For example, each of the plurality of second interlock elements 520 may extend through the spreader arm 100 in a second linear direction (e.g., a longitudinal direction) that is at least substantially different than the first linear direction of the first interlocking element(s) 510.

In various embodiments, the one or more first interface elements 510 may be fixedly secured relative to either the inner arm 110 or the outer arm 120 and may be further configured to be movable (e.g., along with the one of the inner arm 110 and the outer arm 120 to which the one or more element(s) 510 is secured) in one or more directions relative to the other one of the inner arm 110 and the outer arm 120 to which the first elements 510 are not fixedly secured. Further, in various embodiments, the one or more second interface elements 520 may be fixedly secured relative to the other one of the inner arm 110 or the outer arm 120 to which the first interlock elements 510 are not fixedly secured. The one or more second interface elements 520 may be further configured to be movable (e.g., along with the one of the inner arm 110 and the outer arm 120 to which the one or more element(s) 520 is secured) in one or more directions relative to the other one of the inner arm 110 and the outer arm 120 to which the second elements 520 are not fixedly secured. In such an exemplary configuration, the flexible interlock assembly 500 may be configured such that as the inner arm 110 and the outer arm 120 move relative to one another in a third direction perpendicular to each of the first and second directions defined by the first interlock elements 510 and the second interlock elements 520, respectively, one or more of the first interlock elements 510 may physically engage a corresponding one of second interlock elements 520, or vice versa, so as to prevent further relative motion between the inner arm 110 and the outer arm 120 in the third direction. Further, as described in further detail herein, the inner arm 110 and the outer arm 120 may each comprise one or more features, such as, for example, grooves, recesses, openings, orifices, and/or the like, configured to at least partially restrict the range of motion of the interlock elements that are not fixedly secured thereto (e.g., either the first interlock elements 510 or the second interlock elements 520) in one or more directions.

As a non-limiting example illustrated in FIGS. 3B-3C, a spreader arm 400 may comprise a flexible interlock assembly 500 configured to couple inner arm 100 to outer arm 110 within the arm assembly portion 400. The flexible interlock assembly 500 may comprise a plurality of first interlock elements 510 including first interlock elements 511 and 512 arranged so as to extend through the inner arm 110 and the outer arm 120 in an at least substantially vertical direction (e.g., in the y-direction) perpendicular to the width of the spreader bar 100 (e.g., extending in the z-direction and/or a lateral direction). In various embodiments, the first interlock elements 511, 512 may comprise bolt elements that each be fixedly secured to the outer arm 120. Further, the flexible interlock assembly 500 may comprise a plurality of second interlock elements 520 including second interlock elements 521, 522, and 523 arranged so as to extend through the inner arm 110 and the outer arm 120 in an at least substantially longitudinal direction (e.g., in the x-direction) perpendicular to the width of the spreader bar 100 (e.g., extending in the z-direction and/or a lateral direction). In various embodiments, the second interlock elements 521, 522, 523 may comprise pin elements that each be fixedly secured to the inner arm 110.

As illustrated, in various embodiments, the flexible interlock assembly 500 may be configured such that the first interlock elements 510 and the second interlock elements 520 may be arranged in an alternating configuration along the width of the spreader bar 100 such that a first interlock element 510 may be disposed between each set of adjacent second interlock elements 520 and a second interlock element 520 may be disposed between each set of adjacent first interlock elements 510. For example, as shown, first interlock element 511 may be fixedly secured to the outer arm 120 and arranged so as to extend through the arm interface portion 400 along a plane that is in between adjacent second interlock elements 521 and 522. Similarly, as shown, first interlock element 512 may be fixedly secured to the outer arm 120 and arranged so as to extend through the arm interface portion 400 along a plane that is in between adjacent second interlock elements 522 and 523. For example, as inner arm 110 and outer arm 120 move relative to one another in the z-direction, one of the first interlock elements 511, 512 may physical engage a corresponding one of the second interlock elements 521, 522, 523 between which the first interlock element 511, 512 is arranged. In such an exemplary circumstance, the range of motion of first interlock elements 511, 512—and thus, the outer arm 120 fixedly secured thereto—in the lateral direction (e.g., along the z-axis) may be defined by the lateral distance between the adjacent second interlock elements between which the first interlocking element is arranged (e.g., the lateral distance between second interlock elements 521 and 522 and/or the lateral distance between second interlock elements 522 and 523). As a non-limiting example, as the outer arm 120 moves in a negative z-direction relative to the inner arm 110, the flexible interlock assembly 500 may be configured such that at least a portion of the first interlock element 511 fixedly secured to the outer arm 120 may physically engage second interlock element 521 fixedly secured to the inner arm 110, so as to prevent the outer arm 120 from moving further relative to the inner arm 110 in the negative z-direction. Conversely, as the outer arm 120 moves in a positive z-direction relative to the inner arm 110, the flexible interlock assembly 500 may be configured such that at least a portion of the first interlock element 511 fixedly secured to the outer arm 120 may physically engage second interlock element 522 fixedly secured to the inner arm 110, so as to prevent the outer arm 120 from moving further relative to the inner arm 110 in the positive z-direction.

By way of further example, as illustrated, second interlock element 522 may be fixedly secured to the inner arm 110 and arranged so as to extend through the arm interface portion 400 along a plane that is in between adjacent first interlock elements 511 and 512. For example, as inner arm 110 and outer arm 120 move relative to one another in the z-direction, one of the second interlock elements 520, such as, for example, second interlock element 522, may physical engage a corresponding one of the first interlock elements 510 between which the second interlock element 520 is arranged. In such an exemplary circumstance, the range of motion of the second interlock element 522—and thus, the inner arm 110 fixedly secured thereto—in the lateral direction (e.g., along the z-axis) may be defined by the lateral distance between the adjacent first interlock elements 511, 512 between which the second interlocking element 522. As a non-limiting example, as the inner arm 110 moves in a negative z-direction relative to the outer arm 120, the flexible interlock assembly 500 may be configured such that at least a portion of the second interlock element 522 fixedly secured to the inner arm 110 may physically engage a first interlock element 511 fixedly secured to the outer arm 120, so as to prevent the inner arm 110 from moving further relative to the outer arm 120 in the negative z-direction.

Conversely, as the inner arm 110 moves in a positive z-direction relative to the outer arm 120, the flexible interlock assembly 500 may be configured such that at least a portion of the second interlock element 522 fixedly secured to the inner arm 110 may physically engage first interlock element 512 fixedly secured to the outer arm 120, so as to prevent the inner arm 110 from moving further relative to the outer arm 120 in the positive z-direction.

In various embodiments, the flexible interlock assembly 500 may comprise a plurality of first interlock elements 510 arranged so as to at least substantially minimize the relative angular rotation between the inner arm 110 and the outer arm 120 in an angular direction about a central axis of one or more of the first interlock elements 511, 512 along a plane perpendicular thereto. For example, as illustrated, the plurality of first interlock elements 510 may be configured so as to at least substantially minimize the relative angular rotation between the inner arm 110 and the outer arm 120 in an at least substantially horizontal plane (e.g., a rotation in the x-z plane about an at least substantially vertical axis, as shown). Further, in various embodiments, the flexible interlock assembly 500 may comprise a plurality of second interlock elements 520 arranged so as to at least substantially minimize the relative angular rotation between the inner arm 110 and the outer arm 120 in an angular direction about a central axis of one or more of the second interlock elements 521, 522, 523 along a plane perpendicular thereto. For example, as illustrated, the plurality of second interlock elements 520 may be configured so as to at least substantially minimize the relative angular rotation between the inner arm 110 and the outer arm 120 in an at least substantially vertical and longitudinally-facing plane (e.g., a rotation in the y-z plane about an at least substantially longitudinal axis, as shown).

Figure 4B:
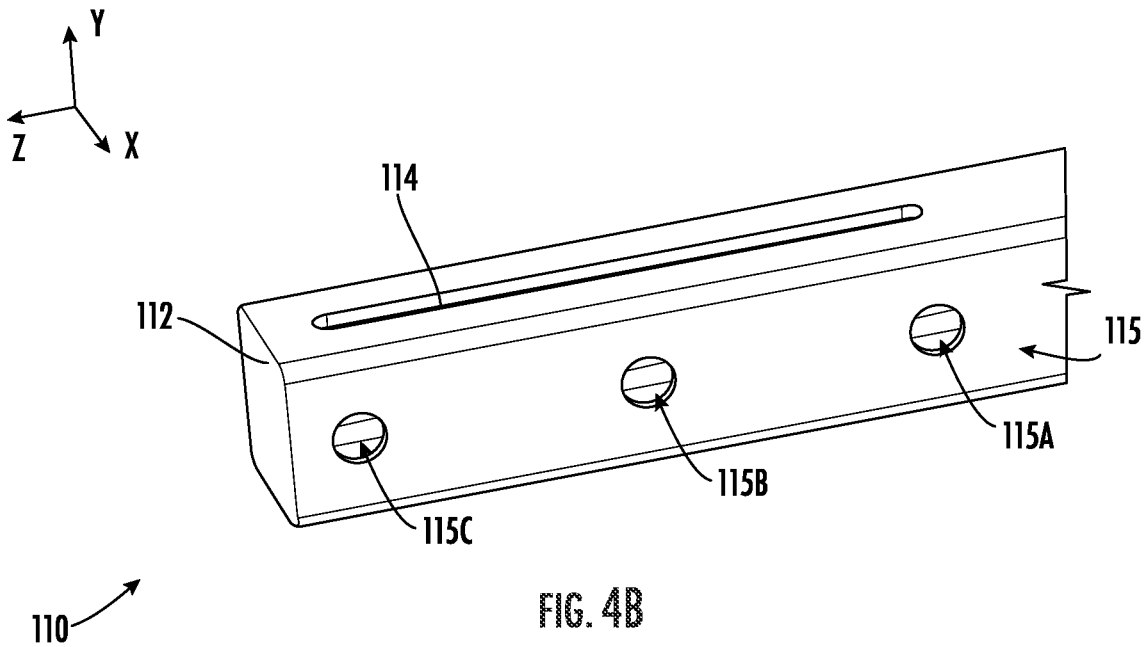

FIGS. 4A-4E illustrate various perspective views of various components of an exemplary carriage lift assembly according to one or more embodiments. In particular, FIG. 4A illustrates a perspective view of various components of a spreader arm 100, including an exemplary arm interface portion 400, as described herein. As illustrated, an arm interface portion 400 of an exemplary spreader arm 100 may be defined by the overlapping portions of the inner arm 110 and the outer arm 120 of a spreader arm 100, including, for example, the width of the inner arm 110 portion disposed within an interior channel of the outer arm 120 and a corresponding width of the outer arm 120 that is arranged around and/or adjacent to the width of the inner arm 110 portion disposed therein (e.g., within the interior channel). In various embodiments, a flexible interlock assembly 500 comprising a plurality of interlock elements may be positioned about the arm interface portion 400 in order to facilitate the resilient configuration of the spreader arm 100. In various embodiments, each of the inner arm 110 and the outer arm 120 may comprise one or more features, such as, for example, grooves, recesses, openings, orifices, and/or the like, configured to receive and/or engage one or more interlock elements of the flexible interlock assembly 500. For example, as illustrated in FIG. 4A, an inner arm 110 and an outer arm 120 may each comprise an at least substantially rectangular (e.g., square) cross-sectional shape defined by an outer perimeter having four sides.

FIG. 4B illustrates a perspective view of an inner arm 110 of an exemplary spreader arm 100 according to various embodiments. In particular, FIG. 4B illustrates a perspective view of the distal end of an inner arm 110, including a second lateral end 112 and various features configured to accommodate a flexible interlock assembly, as described herein. In various embodiments, an inner arm 110 may include a plurality of openings configured to receive at least a portion of the plurality of interlock elements of a flexible interlock assembly. For example, an inner arm 110 may include a plurality of openings 115, each configured such that at least a portion of an interlock element of the flexible interlock assembly, such as, for example, a second interlock element, may be positioned therein and extend therethrough. In various embodiments, each of the plurality of inner arm openings 115 may comprise a rounded opening extending between opposing sides of an inner arm 110 along an at least substantially linear axis. For example, as illustrated, the plurality of inner arm openings 115 may comprise three inner arm openings 115a, 115b, 115c that each extend in an at least substantially longitudinal direction (e.g., in the x-direction) perpendicular to the width of the inner arm 110. In various embodiments, the inner arm openings 115a, 115b, 115c may be spaced a lateral distance apart from one another along the width of the inner arm 110 and extend along respective longitudinal axes that are at least substantially parallel to one another. For example, in various embodiments, adjacent inner arm openings 115a, 115b, 115c may be separated by a lateral distance of at least substantially between 0.25 inches and 2.50 inches (e.g., between 0.75 inches and 1.50 inches). The inner arm openings 115a, 115b, 115c may be configured such that each of the second interlock elements provided within one of the openings 115a, 115b, 115c may be fixedly secured therein, so as to prevent relative motion between one or more of the second interlock elements and the inner arm 110. As such, the lateral spacing between the plurality of inner arm openings 115 along the width of the inner arm 110 may define the lateral distribution of the plurality of second interlock elements along the arm interface portion, as described herein.

Further, in various embodiments, an inner arm 110 may comprise a groove 114 configured such that at least a portion of an interlock element of the flexible interlock assembly, such as, for example, a first interlock element, may be positioned therein and extend therethrough. In various embodiments, the inner arm groove 114 may extend between opposing sides of an inner arm 110 along a plane that extends in a direction that is at least substantially perpendicular to the central axis of one or more inner arm openings 115. For example, in an exemplary circumstance where the inner arm openings 115 extend in a longitudinal direction through two opposing sides of the inner arm's four total sides, the inner arm groove 114 may extend through the other two opposing sides of the inner arm's four total sides along an at least substantially vertical plane, such that one or more of the inner arm openings 115 and at least a portion of the inner arm groove 114 may intersect at one or more locations within an interior of the inner arm 110. In various embodiments, an inner arm groove 114 may comprise an elongated opening defined at least in part by a length extending in a longitudinal direction (e.g., along an x-axis) and a width extending along the width of the inner arm in a lateral direction (e.g., along a z-axis). As a non-limiting example, in various embodiments, an inner arm groove 114 may comprise a length of at least approximately between 1.50 inches and 5.00 inches (e.g., between 2.50 and 3.00 inches). Further, in various embodiments, an inner arm groove 114 may comprise a width of at least approximately between 3.00 inches and 12.00 inches (e.g., between 6.00 and 9.00 inches).

In various embodiments, a plurality of first interlock elements may each extend through the inner arm groove 114 in an at least substantially vertical direction (e.g., in the y-direction) perpendicular to the width of the inner arm 110. The inner arm groove 114 may be configured such that the plurality of first interlock elements extending therethrough may move along the width of the groove 114 in a lateral direction relative to the inner arm 110. Further, the length of the inner arm groove 114 may be at least substantially larger than an outer diameter of the portion of each first interlock element extending therethrough. In such an exemplary circumstance, the plurality of first interlock elements provided within the inner arm groove 114 may be allowed to move along the length of the inner arm groove 114 in a longitudinal direction relative to the inner arm 110. In various embodiments, the inner arm groove 114 may be configured such that the when the carriage lift assembly comprising the exemplary spreader arm is in a nominal position, as described herein, the plurality of first interlock elements may extend through the inner arm groove 114 in an at least substantially floating configuration within the groove 114, wherein the first interlock elements are not physically engaged with the outer walls of the inner arm groove 114.

Figure 4C:
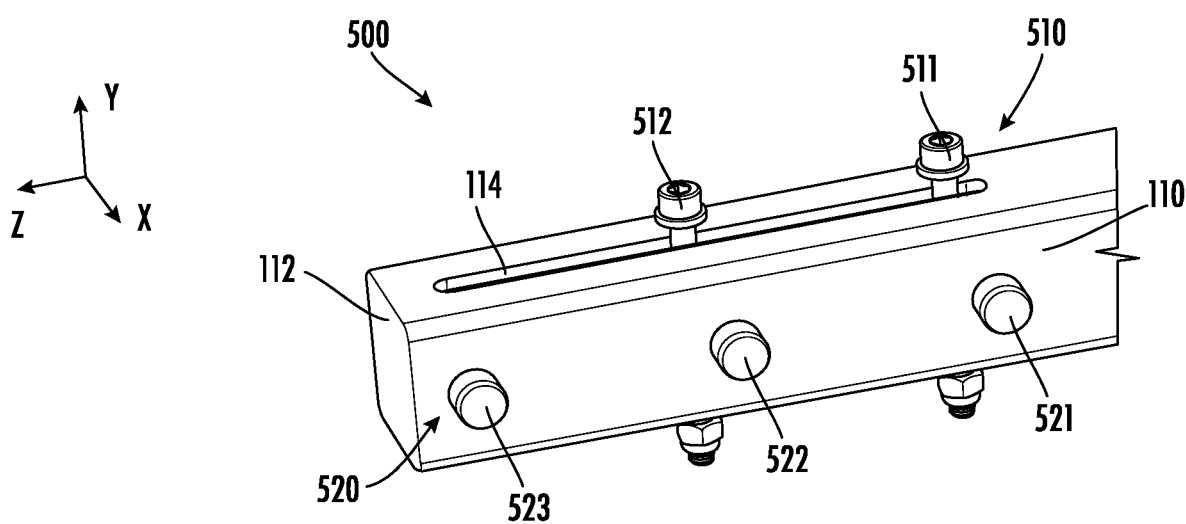

FIG. 4C illustrates a perspective view of an inner arm 110 of an exemplary spreader arm 100 according to various embodiments. In particular, FIG. 4C illustrates a perspective view of the distal end of the inner arm 110 component illustrated in FIG. 4B, further including an exemplary flexible interlock assembly 500 engaged therewith. As illustrated, the flexible interlock assembly 500 may comprise a plurality of first interlock elements 510, including first interlock elements 511, 512, that may extend through opposing sides of the inner arm 110 in an at least substantially vertical direction (e.g., in the y-direction) within the inner arm grove 114. The plurality of first interlock elements 510 may be disposed within the inner arm groove 114 in an at least substantially non-fixed configuration such that the first interlock elements are not fixedly secured to the inner arm 110. For example, the inner arm groove 114 may be configured such that the plurality of first interlock elements 510 may move within the inner arm groove 114 relative to the inner arm 110 both in a lateral direction along the width of the groove 114 and in a longitudinal direction along the length of the groove 114. In various embodiments, the range of relative motion between the first interlock elements 510 and the inner arm 110 in the longitudinal direction within the inner arm groove 114 may correspond at least in part to the difference between the length of the inner arm groove 114 and the outer diameter of the portion of the first interlock elements 511, 512 provided within the groove 114. For example, in various embodiments, the difference between the length of the inner arm groove 114 and the outer diameter of the portion of the first interlock elements 511, 512 provided within the groove 114 may be at least approximately between 1.50 inches and 5.00 inches (e.g., between 2.50 inches and 3.00 inches). In various embodiments, as described herein, the range of relative motion between the first interlock elements 510 and the inner arm 110 in the longitudinal direction (e.g., within the inner arm groove 114) may define the range of relative motion between the inner arm 110 and the outer arm 120 in the longitudinal direction. For example, as described herein, the range of relative motion between the inner arm 110 and the outer arm 120 in the longitudinal direction may be defined at least in part by a maximum deflection distance exhibited by at least a portion of the spreader arm 100 in the longitudinal direction. In various embodiments, in response to one or more longitudinal forces and based at least in part on the configuration of the flexible interlock assembly 500 and/or the arm interface portion 400, as described herein, at least a portion of the spreader arm 100 may be configured to undergo a maximum deflection of at least substantially between −0.125 inches and 0.0125 inches (e.g., between −0.06 inches and 0.06 inches) in the longitudinal direction.

Further, as illustrated, the flexible interlock assembly 500 may comprise a plurality of second interlock elements 520, including second interlock elements 521, 522, 523 that may extend through opposing sides of the inner arm 110 in an at least substantially longitudinal direction (e.g., in the x-direction) within respective inner arm openings 115a, 115b, 115c. The plurality of second interlock elements 520 may be disposed within the inner arm openings 115 in an at least substantially fixed configuration such that the second interlock elements are fixedly secured to the inner arm 110. For example, the second interlock elements 520 extending longitudinally through the inner arm openings 115 along the width of the inner arm 110 may intersect the plane of the inner arm groove 114 at one or more points within the interior of the inner arm 114, such that as the first interlock elements 510 provided within the inner arm groove 114 move along the width of the groove 114 in the lateral direction, the second interlock elements fixed to the inner arm 110 may provide a physical interference that at least partially restricts the lateral range of motion of the first interlock elements 510 within the inner arm groove 114.

Figure 4D:
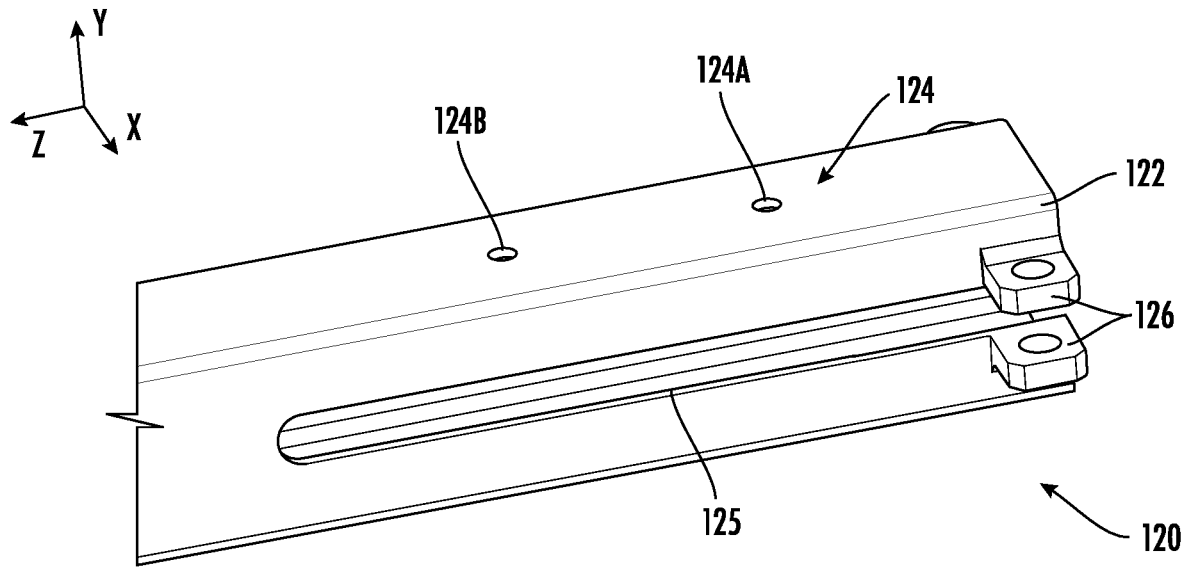

FIG. 4D illustrates a perspective view of an outer arm 120 of an exemplary spreader arm 100 according to various embodiments. In particular, FIG. 4D illustrates a perspective view of the distal end of an outer arm 120, including a second lateral end 122 and various features configured to accommodate a flexible interlock assembly 500, as described herein. In various embodiments, an outer arm 120 may include a plurality of openings configured to receive at least a portion of the plurality of interlock elements of a flexible interlock assembly. For example, an outer arm 120 may include a plurality of openings 124, each configured such that at least a portion of an interlock element of the flexible interlock assembly, such as, for example, a first interlock element, may be positioned therein and extend therethrough. In various embodiments, each of the plurality of outer arm openings 124 may comprise a rounded opening extending between opposing sides of an outer arm 120 along an at least substantially linear axis. For example, as illustrated, the plurality of outer arm openings 124 may comprise two outer arm openings 124a, 124b that each extend in an at least substantially vertical direction (e.g., in the y-direction) perpendicular to the width of the outer arm 120. In various embodiments, the outer arm openings 124a, 124b may be spaced a lateral distance apart from one another along the width of the outer arm 120 and extend along respective vertical axes that are at least substantially parallel to one another. For example, in various embodiments, the outer arm openings 124a, 124b may be separated by a lateral distance of at least substantially between 1.50 inches and 5.00 inches (e.g., between 2.50 inches and 3.00 inches). The inner arm openings 124a, 124b may be configured such that each of the first interlock elements provided within one of the openings 124a, 124b may be fixedly secured therein, so as to prevent relative motion between one or more of the first interlock elements and the outer arm 120. As such, the lateral spacing between the plurality of outer arm openings 124 along the width of the outer arm 120 may define the lateral distribution of the plurality of first interlock elements along the arm interface portion, as described herein.

Further, in various embodiments, an outer arm 120 may comprise a groove 125 configured such that at least a portion of an interlock element of the flexible interlock assembly, such as, for example, a second interlock element, may be positioned therein and extend therethrough. In various embodiments, the outer arm groove 125 may extend between opposing sides of an outer arm 120 along a plane that extends in a direction that is at least substantially perpendicular to the central axis of one or more outer arm openings 124. For example, in an exemplary circumstance where the outer arm openings 124 extend in a vertical direction through two opposing sides of the outer arm's four total sides, the outer arm groove 125 may extend through the other two opposing sides of the inner arm's four total sides along an at least substantially horizontal plane, such that one or more of the outer arm openings 124 and at least a portion of the outer arm groove 125 may intersect at one or more locations within an interior of the outer arm 120. In various embodiments, an outer arm groove 125 may comprise an elongated opening defined at least in part by a height extending in a vertical direction (e.g., along a y-axis) and a width extending along the width of the outer arm 120 in a lateral direction (e.g., along a z-axis). In various embodiments, a plurality of first interlock elements may each extend through the outer arm groove 125 in an at least substantially longitudinal direction (e.g., in the x-direction) perpendicular to the width of the outer arm 120. As a non-limiting example, in various embodiments, an outer arm groove 125 may comprise a length of at least approximately between 5.00 inches and 13.50 inches (e.g., between 6.00 and 8.00 inches). Further, in various embodiments, an outer arm groove 125 may comprise a width of at least approximately between 7.50 inches and 19.50 inches (e.g., between 10.00 and 15.00 inches).

In various embodiments, as illustrated, the outer arm groove 125 may be positioned along the width of the outer arm 120 such that at least a portion of the groove 125 extends to a second lateral end 122 of the outer arm 120. In such an exemplary circumstance, the outer arm 120 may comprise a plurality of flanges 126 protruding in an outward direction away from each of the opposing surfaces through which the outer arm groove 125 extends and positioned adjacent the groove 125 at opposing sides of the height of the groove 125. In various embodiments, the plurality of flanges 126 on each of the opposing sides of the outer arm 126 may be configured such that a spacer element 141, such as, for example, a bushing, a washer, and/or the like, may be fixedly secured therebetween. For example, the spacer elements 141 positioned between respective flanges 126 (e.g., via a spacer element fastener 142) may have a spacer element height that may define a vertical separation distance between the respective flanges 126, and therefore may define height of at least a portion of the outer arm groove 125. Accordingly, in various embodiments, the height of the outer arm groove 125 may adjustable based at least in part on the configuration of the spacer elements 141 disposed between the flanges 126. The outer arm groove 125 may be configured such that the plurality of second interlock elements extending therethrough may move along the width of the groove 125 in a lateral direction relative to the outer arm 120. Further, the height of the outer arm groove 125 may be at least substantially larger than an outer diameter of the portion of each second interlock element extending therethrough. In such an exemplary circumstance, the plurality of second interlock elements provided within the outer arm groove 125 may be allowed to move along the height of the outer arm groove 125 in a vertical direction relative to the outer arm 120. In various embodiments, the outer arm groove 125 may be configured such that the when the carriage lift assembly comprising the exemplary spreader arm is in a nominal position, as described herein, the plurality of second interlock elements may extend through the outer arm groove 125 in an at least substantially floating configuration within the groove 125, wherein the second interlock elements are not physically engaged with the outer walls of the outer arm groove 125.

Figure 4E:
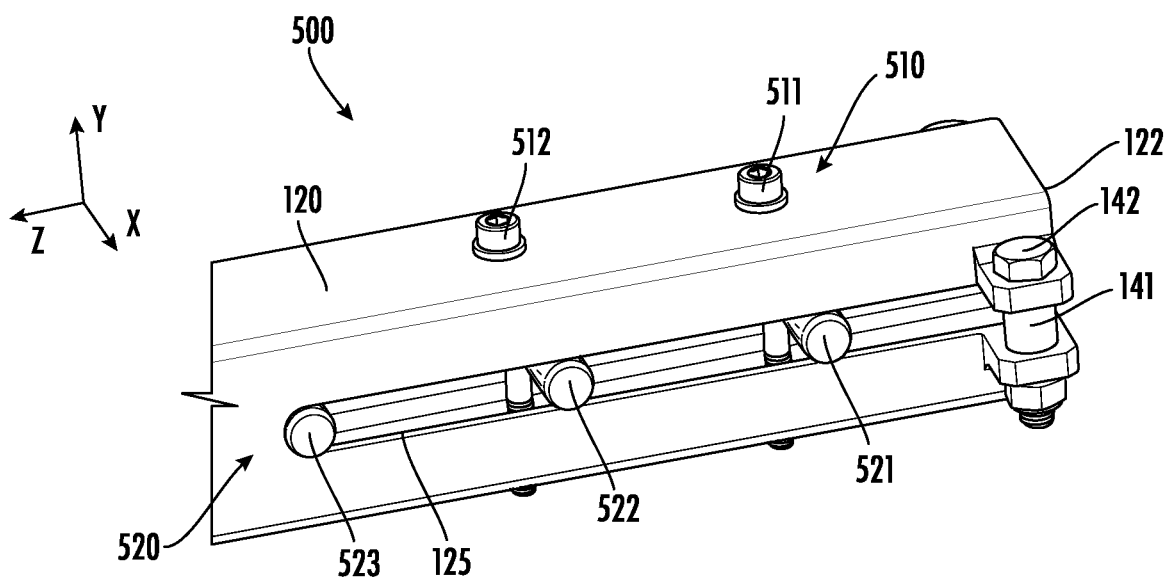

FIG. 4E illustrates a perspective view of an outer arm 12 of an exemplary spreader arm 100 according to various embodiments. In particular, FIG. 4E illustrates a perspective view of the distal end of the outer arm 120 component illustrated in FIG. 4D, further including an exemplary flexible interlock assembly 500 engaged therewith. As illustrated, the flexible interlock assembly 500 may comprise a plurality of second interlock elements 520, including second interlock elements 521, 522, 523 that may extend through opposing sides of the outer arm 120 in an at least substantially longitudinal direction (e.g., in the x-direction) within the outer arm grove 125. The plurality of second interlock elements 520 may be disposed within the outer arm groove 125 in an at least substantially non-fixed configuration such that the second interlock elements are not fixedly secured to the outer arm 120. For example, the outer arm groove 125 may be configured such that the plurality of second interlock elements 520 may move within the outer arm groove 125 relative to the outer arm 120 both in a lateral direction along the width of the groove 125 and in a vertical direction along the height of the groove 125. In various embodiments, the range of relative motion between the second interlock elements 520 and the outer arm 120 in the vertical direction within the outer arm groove 125 may correspond at least in part to the difference between the height of the outer arm groove 125 and the outer diameter of the portion of the second interlock elements 521, 522, 523 provided within the groove 125. For example, in various embodiments, the difference between the height of the outer arm groove 125 and the outer diameter of the portion of the second interlock elements 521, 522, 523 provided within the groove 125 may be at least approximately between 0.010 inches and 0.020 inches (e.g., between 0.013 inches and 0.016 inches). In various embodiments, as described herein, the range of relative motion between the second interlock elements 520 and the outer arm 120 in the vertical direction (e.g., within the outer arm groove 125) may define the range of relative motion between the outer arm 120 and the inner arm 110 in the vertical direction. For example, as described herein, the range of relative motion between the inner arm 110 and the outer arm 120 in the vertical direction may be defined at least in part by a maximum deflection distance exhibited by at least a portion of the spreader arm 100 in the vertical direction. In various embodiments, in response to one or more vertical forces and based at least in part on the configuration of the flexible interlock assembly 500 and/or the arm interface portion 400, as described herein, at least a portion of the spreader arm 100 may be configured to undergo a maximum deflection of at least substantially between −0.125 inches and 0.125 inches (e.g., between −0.060 inches and 0.060 inches) in the vertical direction.

Further, as illustrated, the flexible interlock assembly 500 may comprise a plurality of first interlock elements 510, including first interlock elements 511, 512 that may extend through opposing sides of the outer arm 120 in an at least substantially vertical direction (e.g., in the y-direction) within respective outer arm openings 124a, 124b. The plurality of first interlock elements 510 may be disposed within the outer arm openings 124 in an at least substantially fixed configuration such that the first interlock elements 510 are fixedly secured to the outer arm 120. For example, the first interlock elements 510 extending vertically through the outer arm openings 124 along the width of the outer arm 120 may intersect the plane of the outer arm groove 125 at one or more points within the interior of the outer arm 125, such that as the second interlock elements 520 provided within the outer arm groove 125 move along the width of the groove 125 in the lateral direction, the first interlock elements fixed to the outer arm 120 may provide a physical interference that at least partially restricts the lateral range of motion of the second interlock elements 520 within the outer arm groove 125. In various embodiments, in response to one or more lateral forces and based at least in part on the configuration of the flexible interlock assembly 500 and/or the arm interface portion 400, as described herein, the range of relative motion between the inner arm 110 and the outer arm 120 in the lateral direction exhibit a maximum relative lateral translation of at least substantially between 0.25 inches and 2.50 inches (e.g., between 0.75 inches and 1.50 inches) in a lateral direction.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A carriage lift assembly comprising: at least one frame element configured to secure the carriage lift assembly relative to a first mast and a second mast, the first mast and the second mast being spaced a lateral distance apart, wherein the carriage lift assembly is defined at least in part by a lift width that extends along at least a portion of the lateral distance between the first mast and the second mast; at least one spreader arm defined at least in part by a spreader arm width extending laterally between a first frame end of the at least one frame element and a second frame end of the at least one frame element, wherein the spreader arm width defines at least a portion of the lift width of the carriage lift assembly; and a load surface configured to support one or more objects disposed thereon; wherein the spreader arm width of the at least one spreader arm comprises a selectively adjustable configuration, wherein lift width of the carriage lift assembly is configured to be selectively adjustable based at least in part on the adjustable configuration of the spreader arm width and wherein the first arm element comprises an outer arm comprising an interior channel extending from a distal end of the outer arm along a first width of the outer arm, and wherein the second arm element comprises an inner arm at least partially disposed within the interior channel of the outer arm such that the telescoping configuration of the at least one spreader arm is defined at least in part by an overlapping configuration of the inner arm and the outer arm along an arm interface portion, the arm interface portion comprising a lateral section of the at least one spreader arm along the spreader arm width and wherein the at least one spreader arm comprises a first arm element and a second arm element arranged in an at least partially telescoping configuration defined by an axial range of relative motion between the first arm element and the second arm element, wherein the adjustable configuration of the spreader arm width of the at least one spreader arm is based at least in part on the axial range of relative motion between the first arm element and the second arm element.

2. The carriage lift assembly of claim 1, wherein the at least one spreader arm comprises a first spreader arm and a second spreader arm spaced a longitudinal distance apart and arranged in an at least substantially coplanar configuration.

3. The carriage lift assembly of claim 1, further comprising at least one spring elements configured to apply a lateral force on at least one of the first arm element and the second arm element in order to facilitate an axial relative motion between the first arm element and the second arm element.

4. The carriage lift assembly of claim 1, the first arm element and the second arm element are configured to move relative to one another in one or more directions in response to a force acting on the at least one spreader arm in the one or more directions, wherein a relative movement between the first arm element and the second arm element allows the spreader arm to absorb at least a portion of the force acting thereon.

5. The carriage lift assembly of claim 4, wherein the at least one spreader arm comprises a flexible interlock assembly that operably secures the first arm element relative to the second arm element, and defines a range of relative motion between the first arm element and the second arm element in each of the one or more directions.

6. The carriage lift assembly of claim 5, wherein the flexible interlock assembly comprises a first set of interlock elements extending through both the first arm element and the second arm element in a first interlock direction, and a second set of interlock elements extending through both the first arm element and the second arm element in a second interlock direction, wherein the flexible interlock assemble is configured to define the range of relative motion between the first arm element and the second arm element in each of the one or more directions based at least in part on a physical engagement between the first set of interlock elements and the second set of interlock elements.

7. The carriage lift assembly of claim 1, wherein the at least one spreader arm is configured to enable a relative motion between the first arm element and the second arm element in each of a vertical direction, a lateral direction, and a longitudinal direction.

8. The carriage lift assembly of claim 1, wherein the lift width of the at least one carriage lift assembly is selectively adjustable between a first lift width, a second lift width, and a third lift width based at least in part on the selectively adjustable configuration of the at least one spreader arm.

9. The carriage lift assembly of claim 1, wherein the at least one frame element comprises: a first end plate fixedly secured relative to a first lateral end of the at least one spreader arm; and a second end plate fixedly secured relative to a second lateral end of the at least one spreader arm; wherein the first end plate is configured to operatively connect the first lateral end of the at least one spreader arm to the first mast member, and the second end plate is configured to operatively connect the second lateral end of the at least one spreader arm to the second mast member.

10. The carriage lift assembly of claim 1, wherein the load surface is defined at least in part by one or more rollers configured to facilitate a conveyance of the one or more objects disposed thereon in an at least substantially longitudinal direction along the load surface.

11. A carriage lift assembly comprising: at least one frame element configured to secure the carriage lift assembly relative to a first mast and a second mast, the first mast and the second mast being spaced a lateral distance apart; at least one spreader arm comprising an at least partially resilient configuration and 4 of 10 having a spreader arm width that defines at least a portion of a lift width of the carriage lift assembly; and a load surface configured to support one or more objects disposed thereon; wherein the at least one spreader arm is configured such that, in response to a force acting on the at least one spreader arm in one or more directions, at least a portion of the at least one spreader arm is configured to exhibit a movement in the one or more directions so as to absorb at least a portion of the force acting on the spreader arm and wherein the one or more directions comprises a plurality of directions such that in response to a first force acting on the at least one spreader arm in a first direction, the at least one spreader arm is configured to exhibit a first movement in the first direction so as to absorb at least a portion of the first force acting on the at least one spreader arm in the first direction, and in response to a second force acting on the at least one spreader arm in a second direction, the at least one spreader arm is configured to exhibit a second movement in the second direction so as to absorb at least a portion of the second force acting on the at least one spreader arm in the second direction.

12. The carriage lift assembly of claim 11, wherein the at least one spreader arm comprises a first spreader arm and a second spreader arm spaced a longitudinal distance apart and arranged in an at least substantially coplanar configuration.

13. The carriage lift assembly of claim 11, wherein the at least one spreader arm comprises a first arm element defining a first lateral section of the at least one spreader arm width and a second arm element defining a second lateral section of the at least one spreader arm; and wherein the movement exhibited by the at least one spreader arm in the one or more directions is defined at least in part by a relative movement between the first arm element and the second arm element in the one or more directions.

14. The carriage lift assembly of claim 13, wherein the first arm element and the second arm element are arranged in an at least partially overlapping configuration along an arm interface portion of the at least one spreader arm, wherein the an arm interface portion comprises a lateral section along the spreader arm width of the at least one spreader arm through which at least a portion of both the first arm element and the second arm element extend; wherein the movement of the at least one spreader arm in the one or more directions is defined within the arm interface portion.

15. The carriage lift assembly of claim 14, wherein the at least one spreader arm comprises a flexible interlock assembly that operably secures the first arm element relative to the second arm element, wherein the flexible interlock assembly is configured to at least partially define the relative movement between the first arm element and the second arm element in each of the one or more directions.

16. The carriage lift assembly of claim 15, wherein the flexible interlock assembly comprises a first set of interlock elements extending through both the first arm element and the second arm element in a first interlock direction, and a second set of interlock elements extending through both the first arm element and the second arm element in a second interlock direction, wherein the flexible interlock assemble is configured to define the range of relative motion between the first arm element and the second arm element in each of the one or more directions based at least in part on a physical engagement between the first set of interlock elements and the second set of interlock elements.

17. The carriage lift assembly of claim 13, wherein the first arm element comprises an outer arm comprising an interior channel extending from a distal end of the outer arm along a first width of the outer arm, and wherein the second arm element comprises an inner arm at least partially disposed within the interior channel of the outer arm such that the inner arm and the outer arm of the at least one spreader arm comprise an overlapping configuration along an arm interface portion, the arm interface portion comprising a lateral section of the at least one spreader arm along the spreader arm width.

\* \* \* \* \*